United States Patent [19]

Carpenter et al.

[11] Patent Number: 5,142,590
[45] Date of Patent: Aug. 25, 1992

[54] PATTERN RECOGNITION SYSTEM

[75] Inventors: Gail A. Carpenter; Stephen Grossberg, both of Newton Highlands, Mass.

[73] Assignee: Trustees of Boston University, Boston, Mass.

[21] Appl. No.: 644,685

[22] Filed: Jan. 22, 1991

Related U.S. Application Data

[63] Continuation of Ser. No. 86,732, Jul. 3, 1987, abandoned, which is a PCT/US86/02553, Nov. 26, 1986, abandoned, which is a continuation-in-part of Ser. No. 802,576, Nov. 27, 1985, abandoned.

[51] Int. Cl.$^5$ ............................................. G06K 9/00
[52] U.S. Cl. ........................................ 382/14; 382/15; 382/48
[58] Field of Search ................ 382/1, 10, 13, 14, 15, 382/16, 30, 36, 39, 48; 364/513; 395/20, 21, 23

[56] References Cited

U.S. PATENT DOCUMENTS

| | | | |
|---|---|---|---|
| 3,111,646 | 11/1963 | Harmon | 382/13 |
| 3,191,149 | 6/1965 | Andrews | 382/15 |
| 3,832,683 | 8/1974 | Nadler et al. | 382/39 |
| 3,950,733 | 4/1976 | Cooper et al. | 340/172.5 |
| 4,044,243 | 8/1977 | Cooper et al. | 235/152 |
| 4,177,448 | 12/1979 | Brayton | 382/39 |
| 4,254,474 | 3/1981 | Cooper et al. | 364/900 |
| 4,319,331 | 3/1982 | Elbaum et al. | 364/515 |
| 4,326,259 | 4/1982 | Cooper et al. | 364/715 |
| 4,451,929 | 5/1984 | Yoshida | 382/15 |
| 4,606,069 | 8/1986 | Johnsen | 382/39 |
| 4,773,099 | 9/1988 | Brokser | 382/14 |
| 4,805,225 | 2/1989 | Clark | 382/39 |

OTHER PUBLICATIONS

Carpenter, G. A. and Grossberg, S., "Category learning and adaptive pattern recognition: A neural network mode," *Proceedings of the Third Army Conference on Applied Mathematics and Computing*, 1986, ARO Report 86-1, pp. 37-56.

Carpenter, G. A. and Grossberg, S., "Neural dynamics of category learning and recognition: Attention, memory consolidation, and amnesia", In J. Davis, R. Newburgh and E. Wegman (Eds.), *Brain Structure, Learning, and Memory*, AAAS Symposium Series, 1987.

Carpenter, G. A. and Grossberg, S., "Neural dynamics of category learning and recognition: Structural invariants, reinforcement, and evoked potentials", In M. L. Commons, S. M. Kosslyn, and R. J. Herrnstein (Eds.), *Pattern Recognition and Concepts in Animals, People, and Machines*, Hillsdale, NJ: Erlbaum, 1987.

Carpenter, G. A. and Grossberg, S., "Adaptive resonance theory: Stable self-organization of neural recognition codes in response to arbitrary lists of input patterns", *Proceedings* Cognitive Science Society, 1986.

Carpenter, G. A. and Grossberg, S., "A massively parallel architecture for a self-organizing neural pattern recognition machine", *Computer Vision, Graphics, and Image Processing*, 1987.

Carpenter, G. A. and Grossberg, S., "Associative learning, adaptive pattern recognition, and competitive decision making by neural networks," *Hybrid and Optical Computing*, H. Szu, Ed. SPIE, 1986.

Aleksander I., et al., "Microcircuit learning nets: improved recognition by means of pattern feedback", *Electronic Letters*, GB, Oct. 1968, vol. 4, No. 20, pp. 425-426.

Irakhnenko, A. G., "Self-organizing systems with positive feedback loops" *IEEE Trans. on Aut. Control*, vol. AC-8, No. 3, Jul. 1963, pp. 247-254.

*Primary Examiner*—Jose Couso
*Attorney, Agent, or Firm*—Hamilton, Brook, Smith & Reynolds

[57] ABSTRACT

A self-categorizing pattern recognition system includes an adaptive filter for selecting a category in response to an input pattern. A template is then generated in response to the selected category and a coincident pattern indicating the intersection between the expected pattern and the input pattern is generated. The ratio between the number of elements and the coincident pattern to the number of elements in the input pattern determines whether the category is reset. If the category is not reset, the adaptive filter and template may be modified in response to the coincident pattern. Reset of the selected category is inhibited if no expected pattern is generated. Weighting of the adaptive filter in response to a coincident pattern is inversely related to the number of elements in the input pattern. The selected categories reset where a reset function is less than a vigilance parameter which may be varied in response to teaching events.

31 Claims, 10 Drawing Sheets

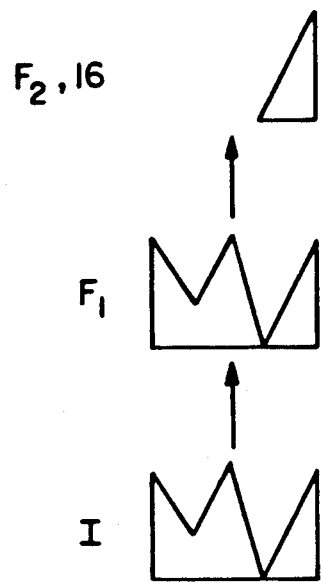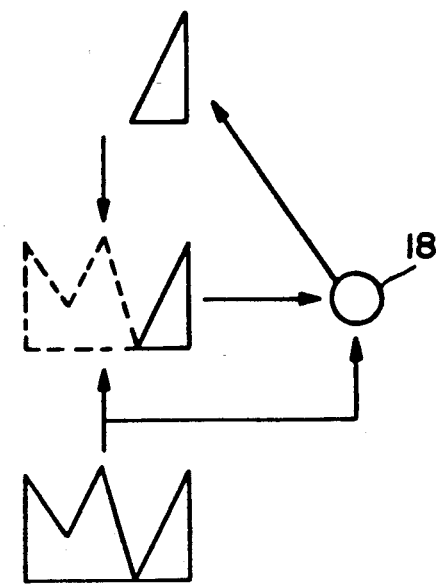
Fig. 2A  Fig. 2B
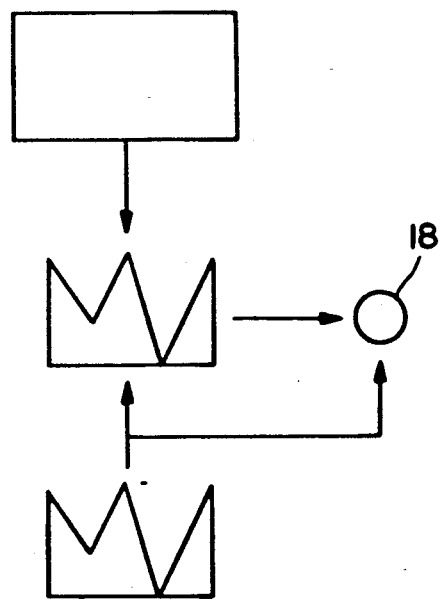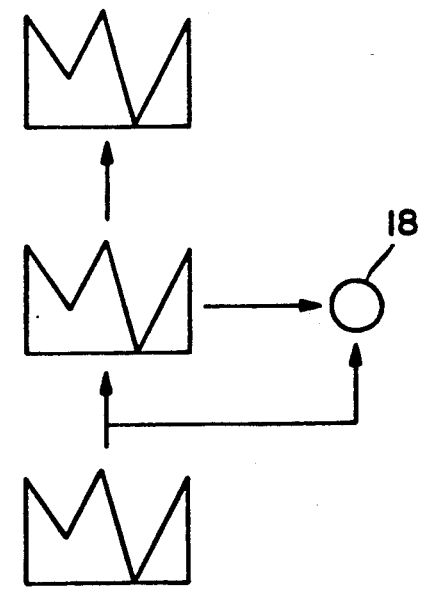
Fig. 2C  Fig. 2D

A B C D

UNSTABLE CODING

|    | BU | 1 | 2 | 3 | 4 |          |
|----|----|---|---|---|---|----------|
| 1  | A  | A |   |   |   | NODE 1   |
|    |    | RES |   |   |   |         |
| 2  | B  | B |   |   |   |          |
|    |    | RES |   |   |   |         |
| 3  | C  | B C |   |   |  |          |
|    |    | RES |   |   |   |         |
| 4  | A  | B A |   |   |  | NODE 2:  |
|    |    | RES |   |   |   | 2/3 RULE FAILS |
| 5  | D  | B D |   |   |  |          |
|    |    | RES |   |   |   |         |

| 6  | A  | A D |   |   |  | NODE 1   |
|    |    | RES |   |   |   |         |
| 7  | B  | B D |   |   |  |          |
|    |    | RES |   |   |   |         |
| 8  | A  | B A |   |   |  |          |
|    |    | RES |   |   |   |         |
| 9  | A  | B A |   |   |  | NODE 2   |
|    |    | RES |   |   |   |         |
| 10 | D  | B D |   |   |  |          |
|    |    | RES |   |   |   |         |

| 11 | A  | A D |   |   |  | NODE 1   |
|    |    | RES |   |   |   |         |
| 12 | B  | B D |   |   |  |          |
|    |    | RES |   |   |   |         |
| 13 | A  | B A |   |   |  |          |
|    |    | RES |   |   |   |         |
| 14 | A  | B A |   |   |  | NODE 2   |
|    |    | RES |   |   |   |         |
| 15 | D  | B D |   |   |  |          |
|    |    | RES |   |   |   |         |

*Fig. 7A*

STABLE CODING

|    | BU | 1 | 2 | 3 | 4 |          |
|----|----|---|---|---|---|----------|
| 1  | A  | A |   |   |   | NODE 1   |
|    |    | RES |   |   |   |         |
| 2  | B  | B |   |   |   |          |
|    |    | RES |   |   |   |         |
| 3  | C  | B C |   |   |  |          |
|    |    | RES |   |   |   |         |
| 4  | A  | B A A |   |   |  | NODE 3:  |
|    |    | 2 1 RES | | | | SEARCH   |
| 5  | D  | B D A |   |   |  |          |
|    |    | RES |   |   |   |         |

| 6  | A  | B D A |   |   |  | NODE 3   |
|    |    | RES |   |   |   |         |
| 7  | B  | B D A |   |   |  |          |
|    |    | RES |   |   |   |         |
| 8  | A  | B D A |   |   |  |          |
|    |    | RES |   |   |   |         |
| 9  | A  | B D A A |   |  | NODE 4:  |
|    |    | 2 3 1 RES | | | | LAST RECODING |
| 10 | D  | B D A A |   |   |  |         |
|    |    | RES |   |   |   |         |

| 11 | A  | B D A A |   |  | DIRECT   |
|    |    | RES |   |   |   | ACCESS  |
| 12 | B  | B D A A |   |   |  |         |
|    |    | RES |   |   |   |         |
| 13 | A  | B D A A |   |   |  |         |
|    |    | RES |   |   |   |         |
| 14 | A  | B D A A |   |   |  |         |
|    |    | RES |   |   |   |         |
| 15 | D  | B D A A |   |   |  |         |
|    |    | RES |   |   |   |         |

A ⊂ B ⊂ C ⊂ D
(a) $p = 0.8$
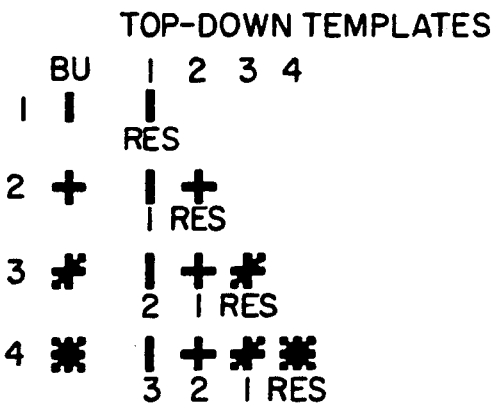
(b) $p = 0.7$
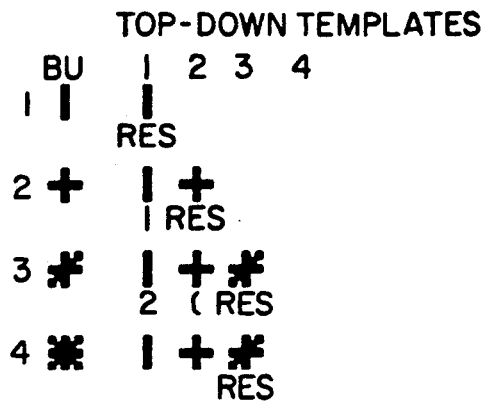
(c) $p = 0.6$
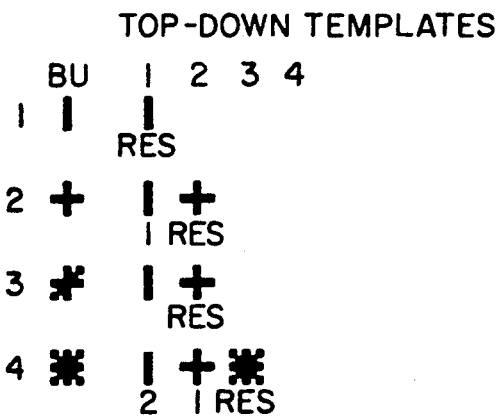
(d) $p = 0.5$
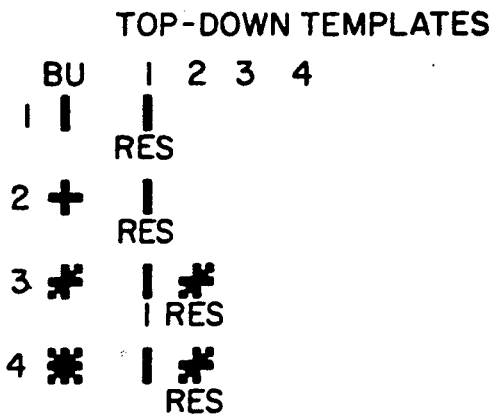
(e) $p = 0.3$
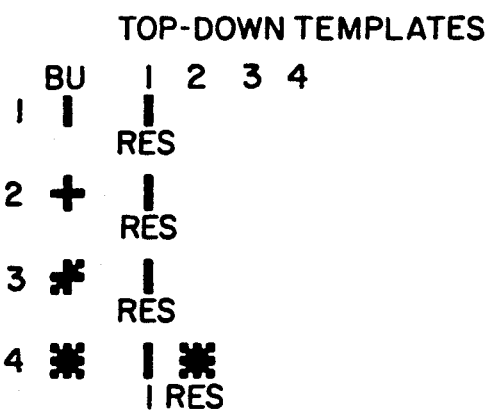
(f) $p = 0.2$
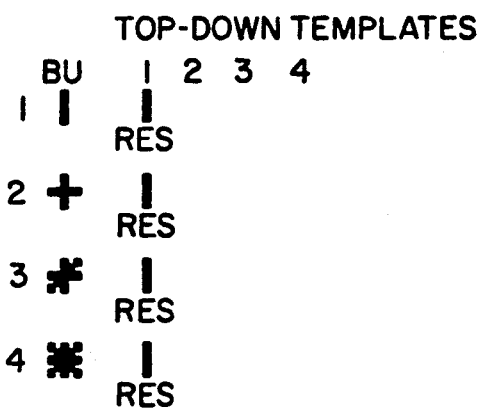
Fig. 11

Fig. 12

(a) TOP-DOWN TEMPLATES $p=0.5$ (b) TOP-DOWN TEMPLATES $p=0.8$

PATTERN RECOGNITION SYSTEM

GOVERNMENT SUPPORT

The U.S. government has rights to this invention under the following contracts
AFOSR85-0149
NSF DMS-84-13119
AFOSR F-49-620-86-C-0037
ARO DAAG-29-85-K0095
NSF-IST-8417756

This is a continuation of co-pending application Ser. No. 07/086,732, filed on Jul. 23, 1987, which is the U.S. phase of PCT/US86/02553, filed Nov. 26, 1986, now abandoned which is the C-I-P of U.S. Ser. No. 07/802,576 filed Nov. 27, 1985 now abandoned.

RELATED PUBLICATIONS

The following publications describe features of this invention and are incorporated herein by reference.

Carpenter, G. A. and Grossberg, S., Category learning and adaptive pattern recognition: A neural network model. Proceedings of the Third Army Conference on Applied Mathementics and Computing, 1986., ARO Report 86-1, pp. 37-56.

Carpenter, G. A. and Grossberg, S., Neural dynamics of category learning and recognition: Attention, memory consolidation, and amnesia. In J. Davis, R. Newburgh, and E. Wegman (Eds.), Brain structure, learning, and memory, AAAS Symposium Series, 1987.

Carpenter, G. A. and Grossberg, S., Neural dynamics of category learning and recognition: Structural invariants, reinforcement, and evoked potentials. In M. L. Commons, S. M. Kosslyn, and R. J. Herrnstein (Eds.) Pattern recognition and concepts in animals, people, and machines. Hillsdale, N.J.: Erlbaum, 1987.

Carpenter, G. A. and Grossberg, S., Adaptive resonance theory: Stable self-organization of neural recognition codes in response to arbitrary lists of input patterns. Proceedings Cognitive Science Society, 1986.

Carpenter, G. A. and Grossberg, S., A massively parallel architecture for a self-organizing neural pattern recognition machine. Computer Vision, Graphics, and Image Processing, 1987.

Carpenter, G. A. and Grossberg, S., Associative learning, adaptive pattern recognition, and competitive decision making by neural networks. Hybrid and Optical Computing, H. Szu, Ed. SPIE, 1986.

Carpenter, G. A. and Grossberg, S., Absolutely stable learning of recognition codes by a self-organizing neural network. Proceedings Snowbird Conference, American Institute of Physics, 1986.

BACKGROUND

Theories have been proposed on which it has been hoped that systems could be developed to receive patterns, such as audio or visual patterns, and automatically develop a scheme for categorizing those patterns into a specific number of categories. Thereafter, such a system should recognize whether a pattern belongs in a previously established category. For example, a system might recognize twenty six categories, each corresponding to a different letter of the alphabet. During a learning process, the system might receive a series of input patterns which may differ even within each category. Elements of the patterns which are not required to categorize the patterns should be rejected as noise.

One theory of category learning was proposed by Stephen Grossberg and is described in "Some Psychophysiological and Pharmacological Correlates of a Developmental, Cognitive and Motivational Theory", *Brain and Information: Event Related Potentials,* Volume 425, Annals of the New York Academy of Sciences, 1984. Under that theory, an input pattern would be stored in short term memory and the pattern would be applied through adaptive filters to select a category. The selected category, retained in another short term memory, would generate an expected pattern corresponding to that category through a parallel set of adaptive filters. The correspondence between the expected pattern and the input pattern would determine whether the input pattern belonged in the initially selected category. If it did, the adaptive filters would be modified to reflect information provided by the input pattern. If the input pattern did not belong in the selected category, this system would prevent modification of the adaptive filters associated with the category and select a new category.

The present invention is based on development of the initial Grossberg theories into an operable machine architecture.

DISCLOSURE OF THE INVENTION

A network, called an adaptive resonance theory (ART) architecture, for adaptive pattern recognition is described herein. The architecture self-organizes and self-stablizes its recognition codes in response to arbitrary orderings of arbitrarily many and arbitrarily complex input patterns. Top-down attentional and matching mechanisms are critical in self-stablizing the code learning process. The architecture embodies a self-adjusting parallel search scheme which updates itself adaptively to maintain its efficiency as the learning process unfolds. After learning self-stabilizes, the search process is automatically disengaged. Thereafter input patterns directly access their recognition codes without any search. Thus recognition time does not grow as a function of code complexity. A novel input pattern can directly access a category if it shares invariant properties with the set of familiar exemplars of that category. These invariant properties emerge in the form of learned critical feature patterns, or prototypes. The architecture possesses a context-sensitive self-scaling property which enables its emergent critical feature patterns to form. They detect and remember statistically predictive configurations of featural elements which are derived from the set of all input patterns that are ever experienced. Four types of attentional process—priming, gain control, vigilance, and intermodal competition—are mechanistically characterized. Top-down priming and gain control are needed for code matching and self-stabilization. Attentional vigilance determines how fine the learned categories will be. If vigilance increases due to an environmental disconfirmation, then the system automatically searches for and learns finer recognition categories. A new nonlinear matching law (the ⅔ Rule) and new nonlinear associative laws (the Weber Law-Rule, the Associative Decay Rule, and the Template Learning Rule) are needed to achieve these properties. All the rules describe emergent properties of parallel network interactions. The architecture circumvents the noise, saturation, capacity, orthogonality, and linear predictability constraints that limit the codes which can be stably learned by alternative recognition models. An ART system can be primed to reject all input patterns that are not consistent with its prototype without undergoing any search or further learning.

In accordance with the present invention, a plurality of input elements of an input pattern are applied to a self-organizing pattern recognition system. The input elements may be processed through an adaptive filter which individually weights the elements relative to each of a plurality of categories. Each category is available to learn patterns derived from input patterns with the elimination of noise. For each category the adaptive filter provides a category selection indication which represents a combination of the weighted input elements. At least one of the categories is then selected based on the magnitude of the combined weighted signals.

Each category defines an expected pattern through a template. Initially, each category defines an expected pattern which includes all possible elements. The expected pattern from the selected category is compared to the input pattern to detect the coincidence of the two. By weighing the coincidence relative to pattern complexity, which may be defined by the number of elements in the input pattern, the system is self-scaling in its categorization decisions. Preferably, coincidence may be determined from a coincident pattern which is an intersection between the expected and input patterns. The number of elements in the coincident pattern can be compared to the number of elements in the input pattern to provide a relative coincidence.

If a sufficient coincidence is detected, the adaptive filter and the stored expected pattern for the selected category are modified. Elements in common between the input pattern and the expected pattern are retained and all other elements are deemphasized. Specifically, in a fast response system, the noncoincident elements are provided zero weight in the adaptive filter to the selected category and the coincident elements are heavily weighted in the adaptive filter to the selected category. The pattern which is thereafter generated by the selected category is the intersection of the previous expected pattern and the input pattern.

If a sufficient relative coincidence is not detected, an alternative category is selected without modifying the adaptive filter or the expected pattern relative to the previously selected category. The alternative category then generates an alternative expected pattern to be compared to the input pattern.

The system may thus select a number of previously defined expected patterns in an order determined by previously learned weights in the adaptive filter until an expected pattern is selected which provides sufficient relative coincidence with the input pattern. Then, any elements which are not in common with the expected pattern and the input pattern are treated as noise in modifying the adaptive filter to the particular category and in redefining the expected pattern from that category.

The adaptive filter is modified when coincidence is detected such that future weights are inversely related to the number of elements in the intersection between the previously expected pattern and the input pattern. Thus, both subsets and supersets can be learned and directly accessed through the adaptive filter.

In a preferred system, a coincident pattern indicating the coincidence between the expected pattern and the input pattern is generated in a short term memory (STM). The relative coincidence is determined by then comparing the coincident pattern with the input pattern. Before an expected pattern is received to generate the coincident pattern, the coincident pattern is the input pattern itself with a high gain applied to the short term memory in which the pattern is stored. Thereafter, when an expected pattern is also applied to the short term memory, the gain is reduced and the expected pattern is superimposed on the input pattern. Only those elements which are found in both the input pattern and the expected pattern can combine to a level sufficient to be considered an element of the coincident pattern.

A reset function can be defined as the number of elements in the intersection between an expected pattern and an input pattern (the coincident pattern) relative to the number of elements in the input pattern. A vigilance parameter can be defined as the ratio of a gain applied to the input pattern elements relative to a gain applied to the coincident pattern. The vigilance parameter can be set for a system and coincidence is considered sufficient to inhibit reset to an alternative selection so long as the reset function is greater than or equal to the vigilance parameter. If the reset function is insufficient, another category is selected according to an order function which can be defined as the ratio of (a) the product of a constant and the number of elements in the coincident pattern to (b) the sum of a constant and the number of elements in the expected pattern.

Vigilance can be changed by an external input where the organization provided by the system does not correspond to external requirements. The system can thus be taught to be more vigilant.

The system may have a basis other than the input pattern for expecting a particular pattern to be selected by the input pattern. In that case, an expected pattern may be generated from a selected category even prior to receipt of an input pattern. Relative coincidence is then determined and the selected category may be accepted or rejected.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 2A-2D illustrate handling of exemplary patterns by the system of FIG. 1.

FIGS. 7A-7B are illustrations of categorical learning by the system of FIG. 1 where the $\frac{2}{3}$ Rule is and is not invoked.

FIG. 8 is an illustration of category searching using the system of FIG. 1.

FIG. 9 is another illustration of the order of search by the system of FIG. 1.

FIG. 10 is an illustration of how the system distinguishes noise from input patterns of variable complexity.

FIG. 11a-11f illustrate the response of the system with various levels of vigilance.

FIGS. 12a-12b illustrate operation of the system in different vigilance levels.

DESCRIPTION OF PREFERRED EMBODIMENTS

Figure 1:
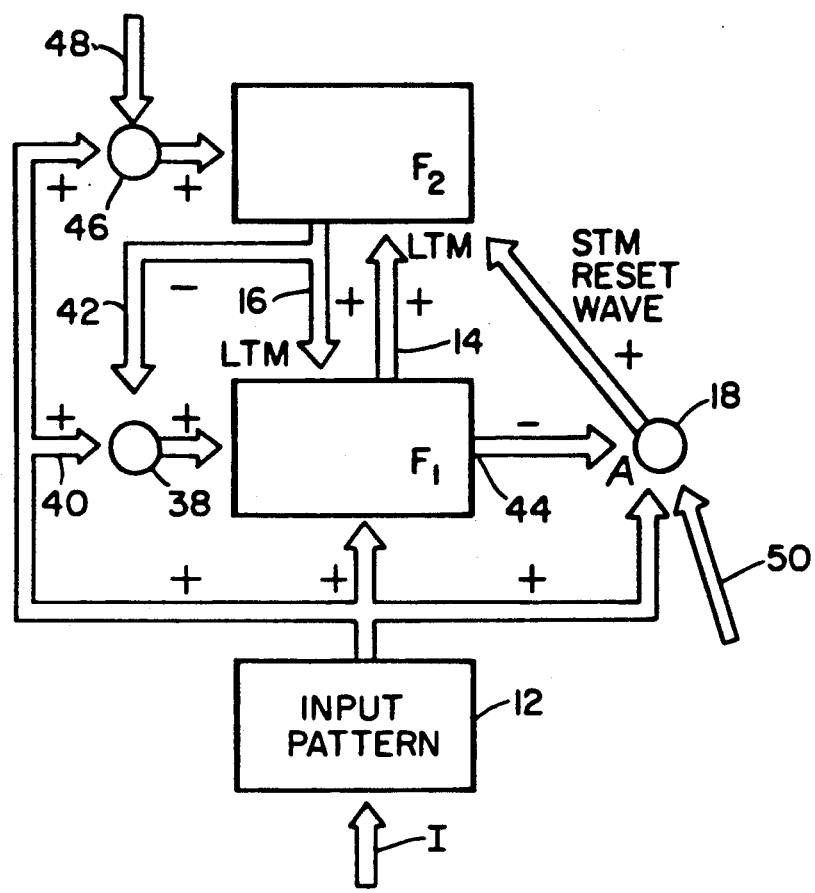
FIG. 1 is a block diagram illustrating a system embodying the present invention.

A system embodying the present invention is illustrated in FIG. 1. The invention may be applied to any form of pattern but will be described with respect to a visual pattern recognition system in which the pattern comprises a two dimensional array of picture elements (pixels). Further, the system may be used with gray tone patterns in which each pixel may assume a wide range of intensity levels but, for the most part, will be described with respect to a bit oriented system in which each pixel has a high or low value.

Input pattern I is stored in a buffer memory 12. The input pattern is applied from the buffer 12 to a short term memory (STM) $F_1$ from which it is applied through adaptive filters 14 to a second short term memory $F_2$. A category selected by the input pattern through the adaptive filters 14 is retained in $F_2$ and generates an expected input pattern for that category through a second set of adaptive filters 16 which serve as a template. The coincidence between the expected pattern and the input pattern is then determined at $F_1$ as will be described below.

Through an orienting system A to be described, the system determines whether the coincidence is sufficient to identify the input pattern as being within the selected category. If the input pattern is not in the selected category, that category is disabled in $F_2$ and another category is selected. If the orienting subsystem 18 identifies the input pattern as being in the selected category, the adaptive filters 14 and 16 are modified in accordance with a coincident pattern retained in $F_1$ to redefine the patterns which select that category and to redefine the expected pattern from the category.

Examples of operation of the system are illustrated in FIGS. 2 and 3. In FIG. 2A, an input pattern I is initially stored at $F_1$. Through the adaptive filters 14, the pattern at $F_1$ selects a category at $F_2$. The selected category in this example has previously been defined by the template 16 to indicate the expected pattern shown at $F_2,16$. As shown in FIG. 2b, the expected pattern is then applied to $F_1$ and a pattern indicative of the intersection between the input pattern and the expected pattern is generated. That coincident pattern is then applied to the orienting subsystem 18 along with the input pattern. The orienting system determines whether the number of pixels in the coincident pattern relative to the number of pixels in the input pattern indicates a correlation between the input pattern and the expected pattern sufficient to categorize the input pattern in the selected category. In the case illustrated in FIG. 2, the orienting subsystem 18 determines that a sufficient match has not been obtained and disables the selected category in $F_2$. The system then selects another category. In the operation illustrated by FIG. 2, the next selected category is one which has not previously been defined so the expected pattern is the full pixel array. As illustrated in FIG. 2C, the intersection between a full pixel array and the input pattern is the input pattern itself. Because the number of pixels in the coincident pattern is identical to the number in the input pattern, the system indicates that the input pattern should be identified with the selected category. The orienting system does not disable the selected category and, as illustrated in FIG. 2D, the expected pattern in the selected category is redefined by the coincident pattern through the adaptive filters 14 and 16.

Figure 3A:
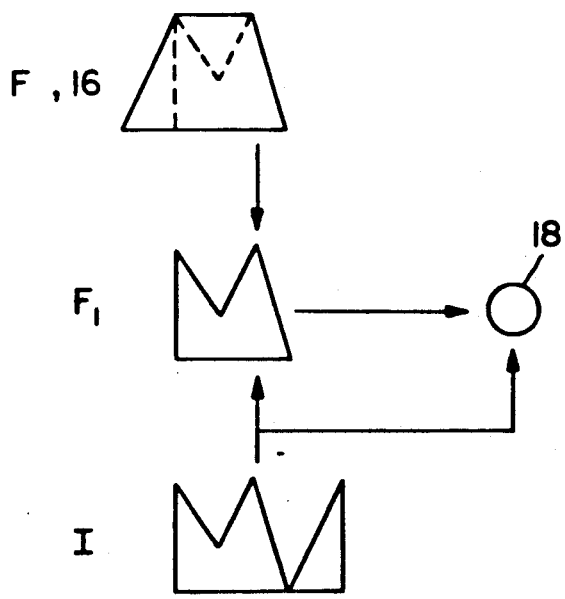
FIGS. 3A-3B are a further example of handling of patterns in the system of FIG. 1.
Figure 3B:
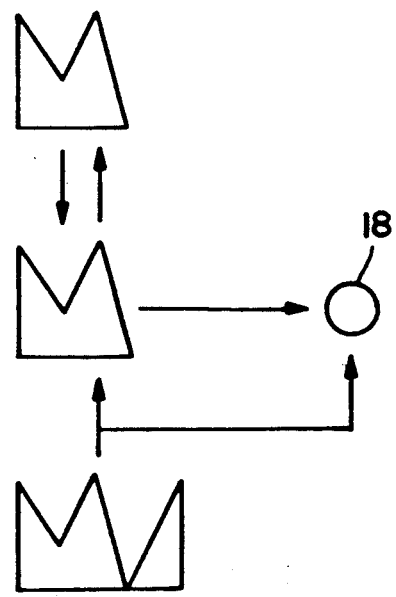

FIG. 3 illustrates another operation in which the pattern initially selected by the input pattern is previously defined as that illustrated at $F_2,16$ of FIG. 3A. The coincident pattern is illustrated at $F_1$. In this case, the system indicates a sufficient correspondence between the coincident pattern and the input pattern and the pattern is redefined by the coincident pattern as illustrated in FIG. 3B.

The adaptive filter 14 is illustrated schematically in FIG. 4. The pattern at $F_1$ resides in a plurality of nodes 20, 21, 22, 23, and 24 corresponding to the pixels of the pattern. In FIG. 4, a gray tone pattern is assumed since more than just two levels are provided. The level of each pixel at each node in $F_1$ is applied through the adaptive filter 14 to each node 25, 26, 27, and 28 at $F_2$. Each node at $F_2$ represents a category. Thus, for example, if the alphabet is being categorized, 26 nodes would be provided. The signal from each pixel node at $F_1$ is weighted by an adaptive filter element 30 of the filter 14 as it is applied to each category node. The different weights are illustrated by the different sizes of terminations 30. Where the weighting is zero, no lines have been shown between the nodes of $F_1$ and those of $F_2$. The weights adapt in learned responses to input patterns and are then retained as elements 30 of adaptive filter long term memory (LTM). In the illustration of FIG. 4, the signals from nodes 21 and 22 through their respective adaptive filter elements to the node 26 sum to the largest magnitude, and the category of node 26 is thus initially selected.

For each adaptive filter element from a node of $F_1$ to a node of $F_2$, there is a corresponding LTM adaptive filter element of filter 16 from the node of $F_2$ to the node of $F_1$. It is those adaptive filter elements which define the expected pattern. From the signal 34 applied to selected node 26 down through adaptive filters 32, a pattern is formed at pixels 21 and 22 as shown in FIG. 4B. As illustrated, the new pattern may include a different set of pixels from that in the initial input pattern at $F_1$ and, in a gray code system, the levels at the respective pixels may be different.

The adaptive filter pathways from $F_1$ to $F_2$ will be referred to as bottom-up pathways and those from $F_2$ to $F_1$ will be referred to as top-down pathways in view of the orientation presented in FIG. 1.

Figure 4A:
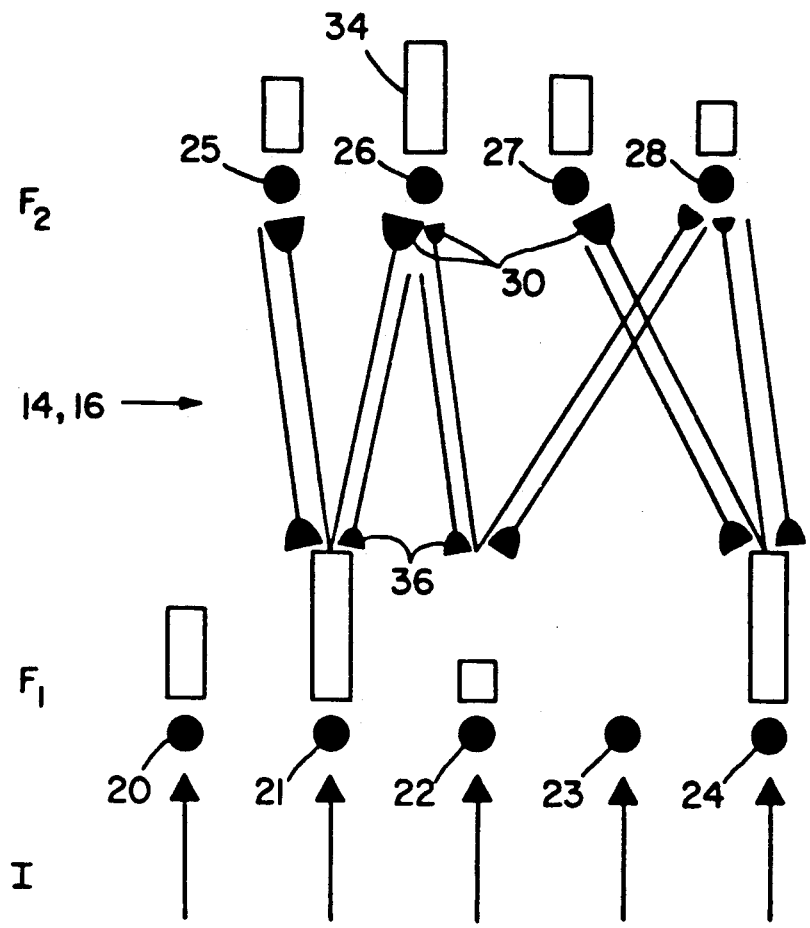
FIGS. 4A-4B are schematic illustrations of adaptive filter elements between the memories $F_1$ and $F_2$ of FIG. 1.
Figure 4B:
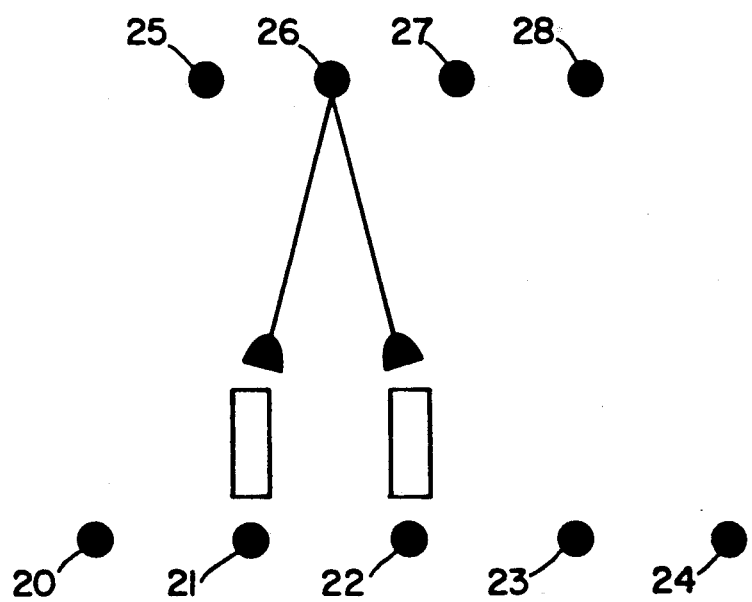

The output pattern shown at $F_2$ in FIG. 4A is a signal 34 at a single category node. It will be recognized, however, that an output pattern of activity may be promoted at the four nodes and each or selected ones of the signals at $F_2$ may contribute through the adaptive filters 16 to the expected pattern applied to $F_1$. The present description applies to a special case of contrast enhancement in which only the node which receives the largest input is chosen and only that node can store activity in the short term memory $F_2$. More general versions of contrast enhancement are presented in Cohen, M. A. and Grossberg, S., "Neural dynamics of speech and language coding: Developmental programs, perceptual grouping, and competition for short term memory," *Human Neurobiology*, (1986, v.5, pp. 1–22) and Grossberg, S., "The adaptive self-organization of serial order in behavior: Speech, language and motor control," Pattern recognition by humans and machines, Vol. 1: Speech perception, E. C. Schwab and H. C. Nusbaum (Eds.), New York: Academic Press, 1986, pp. 187-294.

Until an expected pattern has been provided through the adaptive filter 16 and coincidence is determined relative to the input pattern, it is important that the orienting subsystem 18 not disable the selected node. To that end, the pattern initially retained at $F_1$ is the input pattern itself. When an expected pattern is provided, the resultant coincident pattern is the intersection between the expected pattern and the input pattern. In the present system, this result is obtained by means of a gain control 38.

The gain control provides a nonspecific high gain to each pixel of the pattern received at the input pattern side of $F_1$ when signal 40 indicates an input pattern is being received and signal 42 indicates that no expected pattern is being generated. However, when an expected pattern is generated, the signal on line 42 is subtracted from that on line 40 to eliminate the gain applied from gain control 38 to $F_1$. Without the applied gain, the pixel signals supplied from the input pattern buffer 12 to $F_1$ are insufficient by themselves to generate a coincident pattern on output lines 44; but the signals received from adaptive filters 16 are summed with the signals from the input pattern on a pixel-by-pixel basis. A pixel which receives inputs from both the expected pattern and the input pattern reaches a threshold level in the coincident pattern. However, if a node in $F_1$ receives only a signal from the input pattern or only a signal from the expected pattern, the signal for that pixel does not reach the threshold in the coincident pattern. The result is that the coincident pattern is the intersection between the input pattern and the expected pattern. The above described system can thus be seen to implement a ⅔ Rule whereby a signal is indicated on each pixel for which two of the three inputs from each of the input pattern, the expected pattern and the gain control are received.

Where the pattern elements have binary values, the coincident pattern will be the full intersection of the input pattern and the expected pattern. Where a gray tone is used, however, the coincident pattern may be a partial intersection contained within the full intersection. Where one or both of corresponding elements in the two patterns have low values, the sum of those values may not be sufficient to trigger an element in the coincident pattern.

For the self stabilization of the ⅔ Rule, each element of the coincident pattern can be found in both the input pattern and the expected pattern. The coincident pattern, which controls learning, will not cause emphasis of any element not in the expected pattern. All elements within the coincident pattern are retained in the adaptive filters 14 and 16. All elements not in the coincident pattern are deemphasized by reducing their filter weights relative to the selected category. In a fast learning system, the weights are promptly reduced to zero.

A gain control 46 to $F_2$ allows all short term memory (STM) activity in $F_2$ to be terminated when no input pattern is received. The gain may be activated through an input 48, however, to allow for intentional priming of the system. If the system has a basis other than the input pattern on which to expect that the category to be selected will be a particular one, a signal may be applied to the node at $F_2$ for that category. The thus generated expected pattern would inhibit the gain control 30, and no coincident pattern would be generated until a second input were provided from the input pattern. Such priming of the system may be intermodal. For example, a visual category system might be primed for a category recognized by an auditory system.

Priming allows for fast and accurate response to noisy and/or very fast inputs. It may also direct the order of learning. For example, a visual system may properly categorize a color as red or orange at its level of vigilance. An auditory system may prime the visual system to select one category over the other in the learning process.

LEARNING RULES

Figure 5A:
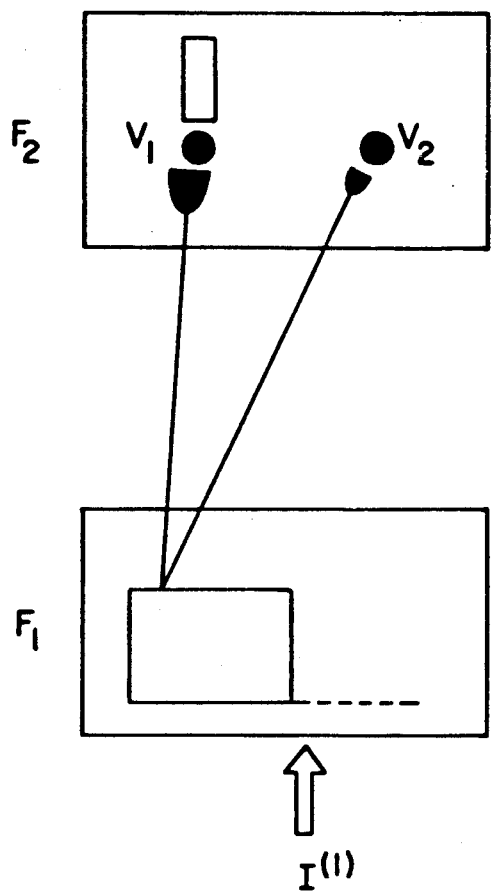
FIGS. 5A-5B are schematic illustrations of the response of the system to subset and superset patterns.

One aspect of the present system can be motivated by considering the following situation. Suppose that a bottom-up input pattern $I^{(1)}$ has already been perfectly coded by the adaptive filter from $F_1$ to $F_2$. Suppose, moreover, that another pattern $I^{(2)}$ has also been perfectly coded and the $I^{(2)}$ contains $I^{(1)}$ as a subset; that is, $I^{(2)}$ equals $I^{(1)}$ at all the nodes where $I^{(1)}$ is positive. If $I^{(1)}$ and $I^{(2)}$ are sufficiently different, they should have access to distinct categories at $F_2$. However, since $I^{(2)}$ equals $I^{(1)}$ at their intersection, and since all the $F_1$ nodes where $I^{(2)}$ does not equal $I^{(1)}$ are inactive when $I^{(1)}$ is presented, how does the network decide between the two categories when $I^{(1)}$ is presented? This question suggests that, in response to an input pattern $I^{(1)}$ that is perfectly coded, the node $v_1$ in $F_2$ which codes $I^{(1)}$ should receive a bigger signal from the adaptive filter than the node $v_2$ which codes a superset $I^{(2)}$ of $I^{(1)}$ (FIG. 5A). In order to realize this constraint, the LTM traces at $v_2$ which filter $I^{(1)}$ should be smaller than the LTM traces at $v_1$ which filter $I^{(1)}$. Since the LTM traces at $v_2$ were coded by the superset pattern $I^{(2)}$, this constraint suggests that larger input patterns are encoded by smaller LTM traces. Thus the absolute sizes of the LTM traces projecting to the different nodes $v_1$ and $v_2$ reflect the overall sizes of the input patterns $I^{(1)}$ and $I^{(2)}$ coded by these nodes.

Figure 5B:
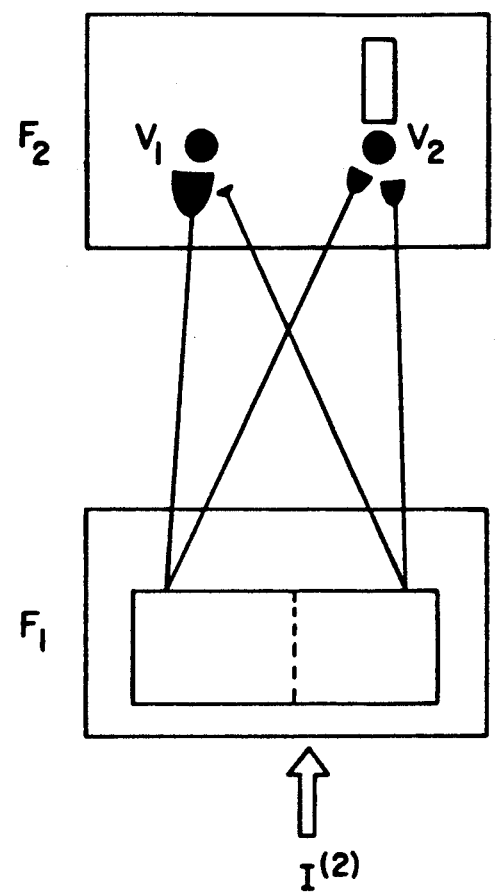

The relative sizes of the LTM traces projecting to a single node reflect the internal structuring of the input patterns coded by that node. Consider, for example, the LTM traces in pathways from $F_1$ nodes where $I^{(1)}$ equals zero to the $F_2$ node $v_1$ (FIG. 5B). During learning of $I^{(1)}$, these LTM traces decay toward zero. By contrast, consider the LTM traces to $v_2$ in pathways from $F_1$ cells that are activated by $I^{(2)}$ but not $I^{(1)}$. These LTM traces become large as learning of $I^{(2)}$ proceeds.

The preceding discussion suggests a constraint that enables a subset $I^{(1)}$ to selectively activate its node $v_1$ rather than the node corresponding to a superset $I^{(2)}$. On the other hand, the superset $I^{(2)}$ should be able to directly activate its node $v_2$ rather than the node $v_1$ of a subset $I^{(1)}$. However, the positive LTM traces of $v_1$ are larger than the corresponding LTM traces of $v_2$, and presentation of $I^{(2)}$ activates the entire subset pattern $I^{(1)}$. The fact that $I^{(2)}$ is filtered by more LTM traces at $v_2$ than it is at $v_1$ must be able to compensate for the larger size of the LTM traces at $v_1$. By establishing a proper balance between the size and the number of positive LTM traces, a Weber Law Rule allows both $I^{(1)}$ and $I^{(2)}$ to have direct access to their respective nodes $v_1$ and $v_2$.

We now describe more precisely the two learning rules whereby the LTM traces allow direct access to both subset and superset $F_2$ codes. The conjoint action of the Weber Law Rule and an Associative Decay Rule for the learned sizes of LTM traces has the desired properties. To fix ideas, suppose that each input pattern I to $F_1$ is a pattern of 0's and 1's. Let $|I|$ denote the number of 1's in the input pattern I. The two rules can be summarized as follows.

According to the Associative Decay Rule, after learning of I has taken place, LTM traces in both the bottom-up coding pathways and the top-down template pathways between an inactive $F_1$ node and an active $F_2$ node equal 0, or at least are very small. Associative learning within the LTM traces can thus cause decreases as well as increases in the sizes of the traces. This is a non-Hebbian form of associative learning.

Under the Weber Law Rule, after learning input pattern I, LTM traces in bottom-up coding pathways corresponding to active $F_1$ and $F_2$ nodes equal $$\frac{\alpha}{\beta + |I|} \quad (1)$$

By (1), the size of each positive LTM trace which codes I decreases as $|I|$ increases.

Consider again the subset $I^{(1)}$ and the superset $I^{(2)}$. By (1), the positive LTM traces which code $I^{(1)}$ have size $$\frac{\alpha}{\beta + |I^{(1)}|} \quad (2)$$

and the positive LTM traces which code $I^{(2)}$ have size $$\frac{\alpha}{\beta + |I^{(2)}|}. \quad (3)$$

where $|I^{(1)}| < |I^{(2)}|$. When $I^{(1)}$ is presented at $F_1$, $|I^{(1)}|$ nodes in $F_1$ are suprathreshold. Thus the total input to $v_1$ has size $$J_{11} = \frac{\alpha |I^{(1)}|}{\beta + |I^{(1)}|} \quad (4)$$

and the total input to $v_2$ has size $$J_{12} = \frac{\alpha |I^{(1)}|}{\beta + |I^{(2)}|}. \quad (5)$$

Because $|I^{(1)}| < |I^{(2)}|$, it follows that $J_{11} > J_{12}$. Thus $I^{(1)}$ activates $v_1$ instead of $v_2$.

When $I^{(2)}$ is presented at $F_1$, $I^{(2)}$ nodes in $F_1$ are suprathreshold. Thus the total input to $v_2$ is $$J_{22} = \frac{\alpha |I^{(2)}|}{\beta + |I^{(2)}|}. \quad (6)$$

We now invoke the Associative Decay Rule. Because $I^{(2)}$ is a superset of $I^{(1)}$, only those $F_1$ nodes in $I^{(2)}$ that are also activated by $I^{(1)}$ project to positive LTM traces at $v_1$. Thus the total input to $V_1$ is $$J_{21} = \frac{|I^{(1)}|}{+ |I^{(1)}|}. \quad (7)$$

Both $J_{22}$ and $J_{21}$ are expressed in terms of the function $$W(\xi) = \frac{\alpha \xi}{\beta + \xi}. \quad (8)$$

which is an increasing function of $\xi$. Since $I^{(1)}$ $I^{(2)}$, $J_{22}$ $J_{21}$. Thus the superset $I^{(2)}$ activates its node $v_2$ over the subset node $v_1$.

In order to characterize the course of learning, the rate of change of the LTM traces on each learning trial must be specified. Here, we consider cases in which, on every learning trial, the LTM traces can reach the new equilibrium values imposed by the input pattern on that trial. We call these fast learning cases. We have also considered cases in which the LTM traces change too slowly to reach the new equilibrium values imposed by the input pattern on a single trial. We call these the slow learning cases.

During both fast learning and slow learning, the STM traces change more quickly than LTM traces, and the learning process eventually self-stablizes. However, the system is more sensitive to the ordering of the input patterns during fast learning than during slow learning. During slow learning, each LTM trace averages across time intervals that are much longer than a single trial, and thereby becomes less sensitive to the ordering of the inputs.

We note, finally, that the § Rule and the Weber Law Rule suggest how the initial values of STM traces and LTM traces should be chosen. The choice of initial STM traces is simple: the system starts out at equilibrium, or with zero STM traces, and the STM traces quickly return to equilibrium after each input pattern shuts off.

Initial LTM traces need to be chosen differently in the bottom-up adaptive filter 14 than in the top-down adaptive filter 16. Due to the Weber Law Rule, the individual bottom-up LTM traces that are learned in response to large input patterns will be relatively small. In order for presentation of a perfectly coded large pattern to directly access its coded node, rather than an uncoded node, the initial values of the bottom-up LTM traces must be smaller than the learned LTM values corresponding to large input patterns. In addition, although some bottom-up LTM traces may initially equal zero, other LTM traces abutting each $F_2$ node must initially be positive in order for $F_1$ to excite that node at all.

Due to the § Rule, the initial top-down LTM traces cannot be too small. When an input pattern first chooses an $F_2$ node, the LTM traces that gate the top-down template of that node must satisfy the § Rule even before any template learning occurs. If the top-down LTM traces started out too small, no $F_1$ node would receive enough top-down input to satisfy the § Rule. Consequently, the whole system would shut down. Top-down learning is thus a type of learning-by-selection.

In summary, bottom-up LTM traces start out small, whereas top-town LTM traces start out large. Bottom-up learning and top-down learning sculpt the spatial distribution of their LTM traces, as well as their overall sizes, through time. The constraint that the initial sizes of the top-down LTM traces be large is a consequence of the § Rule. The constraint that the initial sizes of the bottom-up LTM traces be small is needed to guarantee direct access to perfectly coded $F_2$ nodes. We therefore call this latter constraint the Direct Access Rule.

ORDER OF SEARCH

We can now begin to characterize the order of search in a network that obeys the following constraints: 1) Fast learning occurs; 2) Input patterns are composed of 0's and 1's; 3) The ⅔ Rule holds; 4) The Weber Law Rule holds; and 5) The Direct Access Rule holds.

This discussion of search order does not analyze whether or not an STM reset event will stop the search at any given step. The criteria for STM rest are provided below.

A simple function determines the order in which encoded $F_2$ nodes $v_j$ are searched in response to an input pattern I. This function, which we call the Order Function, is defined as follows:

$$T_j = \frac{\alpha |V^{(j)} \cap I|}{\beta + |V^{(j)}|} \quad (9)$$

In equation (9), $V^{(j)}$ denotes the top-down template pattern that is read-out by node $v_j$ of $F_2$. Since only one node at a time is active in $F_2$, the total template read-out by $F_2$ is the template corresponding to the node which is active at that time.

After I has been presented to $F_1$, but before $F_2$ becomes active, function $T_j$ in (9) is the total bottom-up input to node $v_j$. Term $\alpha(\beta + |V^{(j)}|)^{-1}$ in (9) is a consequence of the Weber Law rule. This term describes the size of the positive learned LTM traces which abut $v_j$. Term $|V^{(j)} \cap I|$ describes the number of pathways abutting node $v_j$ which have positive learned LTM traces and which carry positive signals when input I is presented. The total number of pathways abutting $v_j$ which have positive learned LTM traces is $V^{(j)}$. This is true because a bottom-up LTM trace from node $v_i$ in $F_1$ to node $v_j$ in $F_2$ grows due to learning if and only if the corresponding top-down LTM trace from $v_j$ to $v_i$ grows due to learning. There are as many positive learned LTM traces in pathways leading to $v_j$ as there are in pathways leading from $v_j$. At times when input I is registered by $F_1$, only $|V^{(j)} \cap I|$ of these $|V^{(j)}|$ pathways are activated. The total input to node $v_j$ in $F_2$ is thus given by $T_j$ in (9).

From the selected node $v_j$, an expected pattern is applied to $F_1$. That expected pattern may include fewer active pixels then were active in the original pattern in $F_1$ and, under the ⅔ Rule, some of those nodes in $F_1$ which were initially active may be deactivated. Deactivation of those nodes will, however, not change the value $T_j$ received at selected node $v_j$ and the selection will thus remain stable. This is because elimination of a top-down pathway is only obtained concurrently with the elimination of a bottom-up pathway, and an $F_1$ node which is deactivated by the expected pattern would not have previously presented a pathway to the selected $F_2$ node. With the deactivation of $F_1$ nodes when the expected pattern is received at $F_1$ and with activation of additional $F_1$ nodes not being possible, the remaining non-selected $F_2$ nodes receive the same or a lesser order function $T_j$.

Figure 6A:
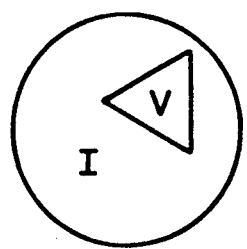
FIGS. 6A-6C are illustrations of possible relationships between an input pattern and an expected pattern.
Figure 6B:
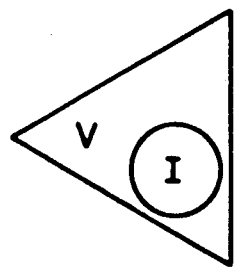
Figure 6C:
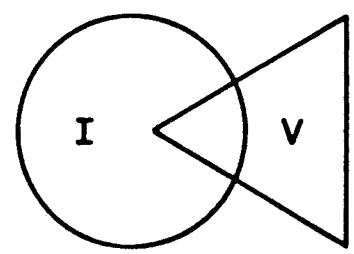

To discuss the order of search in response to the input pattern I, we define three types of learned templates: subset templates, superset templates, and mixed templates. The LTM traces of a subset template V are large only at a subset of the $F_1$ nodes which are activated by the input pattern I (FIG. 6A). The LTM traces of a superset template V are large at all the $F_1$ nodes which are activated by the input pattern I, as well as at some $F_1$ nodes which are not activated by I (FIG. 6B). The LTM traces of a mixed template V are large at some, but not all, the $F_1$ nodes which are activated by the input pattern I, as well as at some $F_1$ nodes which are not activated by I (FIG. 6C).

If a search ends when a prescribed template $V^{(j)} = V$ is being read-out by the $F_2$ node $v_j$, then this template's LTM traces recode to the new template $V^{(j)} = V \cap I$. This conclusion follows from the conjoint action of the ⅔ Rule and the Associative Decay Rule. Only $F_1$ nodes in the set V I can remain supraliminal due to the ⅔ Rule, and the LTM traces of pathways between $v_j$ and inactive $F_1$ nodes converge to zero due to the Associative Decay Rule. Thus, after learning occurs, the active template $V^{(j)} = V$, whether it began as a subset template, a superset template, or a mixed template, is recoded into the subset template $V^{(j)} = V \cap I$ by the input pattern I. This subset recoding property is a key requirement for code stability.

We now illustrate the importance of the subset recoding property by describing how its absence can lead to a temporally unstable code.

FIG. 7A summarizes a computer simulation of unstable code learning where the inhibitory top-down attentional gain control signals 42 are chosen too small for the ⅔ Rule to hold at $F_1$. FIG. 7B summarizes a computer simulation that illustrates how reinstatement of the ⅔ Rule can stabilize code learning. The format used in this figure will also be used in displaying our other computer simulations. We therefore describe this figure in detail.

The first column of FIG. 7A describes the four input patterns that were used in the simulation. These input patterns are labeled A, B, C, and D. Patterns B, C, and D are all subsets of A. The relationships among the inputs that make the simulation work are as follows:

$$D \subset C \subset A, \quad (11)$$

$$B \subset A, \quad (12)$$

$$B \cap C = \Phi \quad (13)$$

$$|D| < |B| < |C| \quad (14)$$

These results thus provide infinitely many examples in which an alphabet of just four input patterns cannot be stably coded without the ⅔ Rule. The numbers 1, 2, 3, . . . listed in the second column itemize the presentation order. The third column, labeled BU for Bottom-Up, describes the input pattern that was presented on each trial. In both FIGS. 7A and 7B, the input patterns were periodically presented in the order ABCAD.

Each of the Top-Down Template columns in FIG. 7 corresponds to a different node in $F_2$, with column 1 corresponding to node $v_1$, column 2 corresponding to node $v_2$, and so on. Each row summarizes the network response to its input pattern. The symbol RES, which stands for resonance, designates the node in $F_2$ which codes the input pattern on that trial. For example, $v_2$ codes pattern C on trial 3, and $v_1$ codes pattern B on trial 7. The patterns in a given row describe the templates after learning has occurred on that trial.

In FIG. 7A, input pattern A is periodically recoded: On trial 1, it is coded by $v_1$; on trial 4, it is coded by $v_2$; on trial 6, it is coded by $v_1$; on trial 9, it is coded by $v_2$. This alternation in the nodes $v_1$ and $v_2$ which code pattern A repeats indefinitely.

Violation of the ⅔ Rule occurs on trials 4, 6, 8, 9, and so on. This violation is illustrated by comparing the template of $v_2$ on trials 3 and 4. On trial 3, the template of $v_2$ is coded by pattern C, which is a subset of pattern A. On trial 4, pattern A is presented and directly activates node $v_2$. Because the ⅔ Rule does not hold, pattern A remains supraliminal, that is above threshold, in $F_1$ even after the subset template C is read-out from $v_2$. Thus no search is elicited by the mismatch of pattern A and its subset template C. Consequently the template of $v_2$ is recoded from pattern C to its superset pattern A.

In FIG. 7B, by contrast, the ⅔ Rule does hold due to a larger choice of the attentional gain control parameter. Thus the network experiences a sequence of recodings that ultimately stabilizes. In particular, on trial 4, node $v_2$ reads-out the subset template C, which mismatches the input pattern A. The numbers beneath the template symbols in row 4 describe the order of search. First, $v_2$'s template mismatches A. Then $v_1$'s template B mismatches A. Finally A activates the uncommitted node $v_3$, which resonates with $F_1$ as it learns the template A.

Scanning the rows of FIG. 7B, we see that pattern A is coded by $v_1$ on trial 1; by $v_3$ on trials 4 and 6; and by $v_4$ on trial 9. On all future trials, input pattern A is coded by $v_4$. Moreover, all the input patterns A, B, C, and D have learned a stable code by trial 9. Thus the code self-stabilizes by the second run through the input list ABCAD. On trials 11 through 15, and on all future trials, each input pattern chooses a different node (A to $v_4$; B to $v_1$; C to $v_3$; D to $v_2$). Each pattern belongs to a separate category because the vigilance parameter discussed below was chosen to be large in this example. Moreover, after code learning stablizes, each input pattern directly activates its node in $F_2$ without undergoing any additional search. Thus after trial 9, only the "RES" symbol appears under the top-down templates. The patterns shown in any row between 9 and 15 provide a complete description of the learned code.

Examples of how a novel exemplar can activate a previously learned category are found on trials 2 and 5 in FIGS. 7A and 7B. On trial 2, for example, pattern B is presented for the first time and directly accesses the category coded by $v_1$, which was previously learned by pattern A on trial 1. In terminology from artificial intelligence, B activates the same categorical "pointer," or "marker," or "index" as in A. In so doing, B does not change the categorical "index," but it may change the categorical template, which determines which input patterns will also be coded by this index on future trials. The category does not change, but its invariants may change.

An example of how presentation of very different input patterns can influence the category of a fixed input pattern is found through consideration of trials 1, 4, and 9 in FIG. 7B. These are the trials on which pattern A is recoded due to the intervening occurrence of other input patterns. On trial 1, pattern A is coded by $v_1$. On trial 4, A is recoded by $v_3$ because pattern B has also been coded by $v_1$ and pattern C has been coded by $v_2$ in the interim. On trial 9, pattern A is recoded by $v_4$ both because pattern C has been recoded by $v_3$ and pattern D has been coded by $v_2$ in the interim.

In all of these transitions, the global structure of the input pattern determines which $F_2$ nodes will be activated, and global measures of pattern match at $F_1$ determine whether these nodes will be reset or allowed to resonate in STM.

SEARCH OF SUBSETS, SUPERSETS, AND MIXED SETS

Before the code in FIG. 7B finally stabilizes, it searches the network in the order characterized by the values $T_j$. We now described implications of this search order in a case of special interest, which includes the example described in FIG. 7B. This is the case wherein parameter $\beta$ in equation (9) is "small." By small, we mean that parameter $\beta$ satisfies the inequality $$\beta < \frac{1}{|I|_{max} - 1} \tag{15}$$

where $|I|_{max}$ is the largest number of $F_1$ nodes that are activated by any input pattern I.

A. Subset Templates

Suppose that there exist learned templates which are subsets of the input pattern I (FIG. 6A). Then, if inequality (15) holds, the first node in $F_2$ to be chosen corresponds to the largest subset template V. Whether or not template V can match the input I well enough to prevent STM reset of $F_2$ depends upon the orienting system 18 to be described, as well as upon how much smaller V is then I. If V=I, then reset never occurs. In this case, the Direct Access Rule implies that the node corresponding to V is chosen first. This node's template V covers I at $F_1$. Consequently, no reduction in $F_1$ activity is caused by the ⅔ Rule, and STM reset does not occur.

If the first chosen node does not cover I, then reset may occur. If reset does occur, then the network continues to search $F_2$ nodes which possess subset templates. Search order proceeds from larger to smaller subset templates. This search order follows from (9) because, whenever $V^{(j)} \subset I$, then $V^{(j)} \cap I = V^{(j)}$, so that the order function $T_j$ satisfies $$T_j = \frac{\alpha|V^{(j)}|}{\beta + |V^{(j)}|} . \tag{16}$$

Thus the order in which subset templates are searched is determined by the relative sizes of $V^{(j)}$ across all subset templates. FIG. 7B illustrates these subset search properties. On trial 9, for example, in response to the input pattern A, the nodes corresponding to the subset templates C, B, and D are searched in order of decreasing template size, as in (14).

B. Superset Templates and No Mixed Templates

Suppose that the network has searched all learned subset templates corresponding to the input pattern I. We now consider the subsequent search order by breaking up the possibilities into several cases. We suppose that no mixed templates have been learned, but that at least one superset template has been learned.

Our main conclusion is that, if all subset templates have already been reset, then the system will code input I using the $F_2$ node $v_j$ with the smallest superset template $V^{(j)} = V$. Due to this coding event, $V^{(j)}$ will be recoded to $$V^{(j)} = V \cap I = I \tag{17}$$

The network chooses the smallest superset template first because $$T_j = \frac{\alpha |I|}{\beta + |V|} \qquad (18)$$

whenever $V \supset I$. Thus the smallest of the superset templates generates the largest bottom-up input $T_j$. The network does not reset this choice because the superset template V completely covers the input pattern I at $F_1$. By the $\frac{2}{3}$ Rule, the $F_1$ activity pattern caused by I alone persists after the superset template takes effect. No reduction of $F_1$ activity is caused by the superset template. Hence its $F_2$ code is not reset by the orienting subsystem. Thus the same property which guarantees stable choices in STM also implies that search ends if it can reach the smallest superset template.

It remains to explain why subsets are searched before supersets, and why supersets are searched before uncommitted nodes.

Given a subset template $V^{(i)}$ and a superset template $V^{(j)}$ of the input pattern I, $$|V^{(i)}| \leq |I| < |V^{(j)}|, \qquad (19)$$

$$T_i = \frac{\alpha |V^{(i)}|}{\beta + |V^{(i)}|} \qquad (20)$$

and $$T_j = \frac{\alpha |I|}{\beta + |V^{(j)}|} \qquad (21)$$

It follows from (15), (19), (20), and (21) that $$T_i > T_j. \qquad (22)$$

and hence that subset templates are searched before superset templates. This property depends critically on the small choice of $\beta$ in (18).

Nodes with superset templates are searched before uncommitted nodes due to the same property that guarantees direct access to perfectly coded nodes. We noted that initial bottom-up LTM values must be chosen small enough to permit direct access to nodes which perfectly code any input pattern. In particular, $$z_0 < \frac{\alpha}{\beta |V^{(j)}|}, \qquad (23)$$

where $z_0$ is the maximal size of any initial bottom-up LTM trace, and $\alpha(\beta + |V^{(j)}|)^{-1}$ is the learned LTM value corresponding to the superset template $V^{(j)}$. The total bottom-up input to an uncommitted node in response to input I is thus at most $Z_0|I|$, which is less than the total bottom-up input $\alpha|I|(\beta + |V^{(j)}|)^{-1}$ to a superset node $v_j$.

C. Superset Templates and Mixed Templates

Suppose that the network has already searched its subset templates. Suppose also that both superset templates and mixed templates have previously been learned. We have shown that, if a node with a superset template is activated, then the input pattern will be coded by that node. In particular, the node's template will be recoded to match the input pattern perfectly. We now characterize the circumstances under which the network will search mixed templates before it searches superset templates.

Consider nodes $v_i$ which code mixed templates $V^{(i)}$ with respect to the input pattern I. Also let $V^{(j)}$ be the smallest superset template corresponding to I. Then $$T_i = \frac{\alpha |V^{(i)} \cap I|}{\beta + |V^{(i)}|} \qquad (24)$$

and $$T_j = \frac{\alpha |I|}{\beta + |V^{(j)}|}. \qquad (25)$$

A mixed template $V^{(i)}$ will be searched before the superset template $V^{(j)}$ if and only if $$\frac{|V^{(i)} \cap I|}{|V^{(i)}|} > \frac{|I|}{|V^{(j)}|}. \qquad (26)$$

Since a search always ends when a superset node is chosen, only nodes $V_i$ whose mixed templates satisfy (26) can possibly be searched. These nodes are searched in order of decreasing $|V^{(i)} \cap I| |V^{(i)}|^{-1}$. If two nodes have the same ratio, then the one with the larger mixed template is searched first. If the search reaches the node $v_j$ with the smallest superset template, then it terminates at $v_j$.

Suppose that the network has already searched its subset templates. Suppose that mixed templates, but no superset templates, have previously been learned. In this situation, the search can end by choosing either a node $V_i$ with a mixed template $V^{(i)}$ or a node which has not previously been chosen. For example, a node $V_i$ with mixed template will be chosen before a new node if $$\frac{\alpha |V^{(i)} \cap I|}{\beta + |V^{(i)}|} > z_0 |I|, \qquad (28)$$

where $z_0$ is the maximal initial size of the bottom-up LTM traces. Recall that $$\frac{\alpha}{\beta + |V^{(i)}|} > z_0 \qquad (29)$$

for all templates $V^{(i)}$ in order to enable perfectly coded nodes to be directly accessed. Inequality (28) can thus hold when $|V^{(i)} \cap I|$ is not too much smaller than I.

D. Neither Mixed Templates Nor Superset Templates

In this case, after all subset nodes are searched, the previously uncommitted nodes are searched. Their initial bottom-up input sizes to $F_2$ depend upon the choice of initial LTM traces. Thus the order of search among the uncommitted nodes is determined by a random factor. The first uncommitted node that is activated ends the search and codes the input pattern I. This is true because all initial top-down LTM traces are chosen large enough to satisfy the $\frac{2}{3}$ Rule.

In case there are no uncommitted nodes to be searched after all committed nodes are rejected, then the input pattern cannot be coded by the network. This property is a consequence of the network's ability to buffer, or protect, its codes against persistent recoding by unappropriate events.

Figure 8:
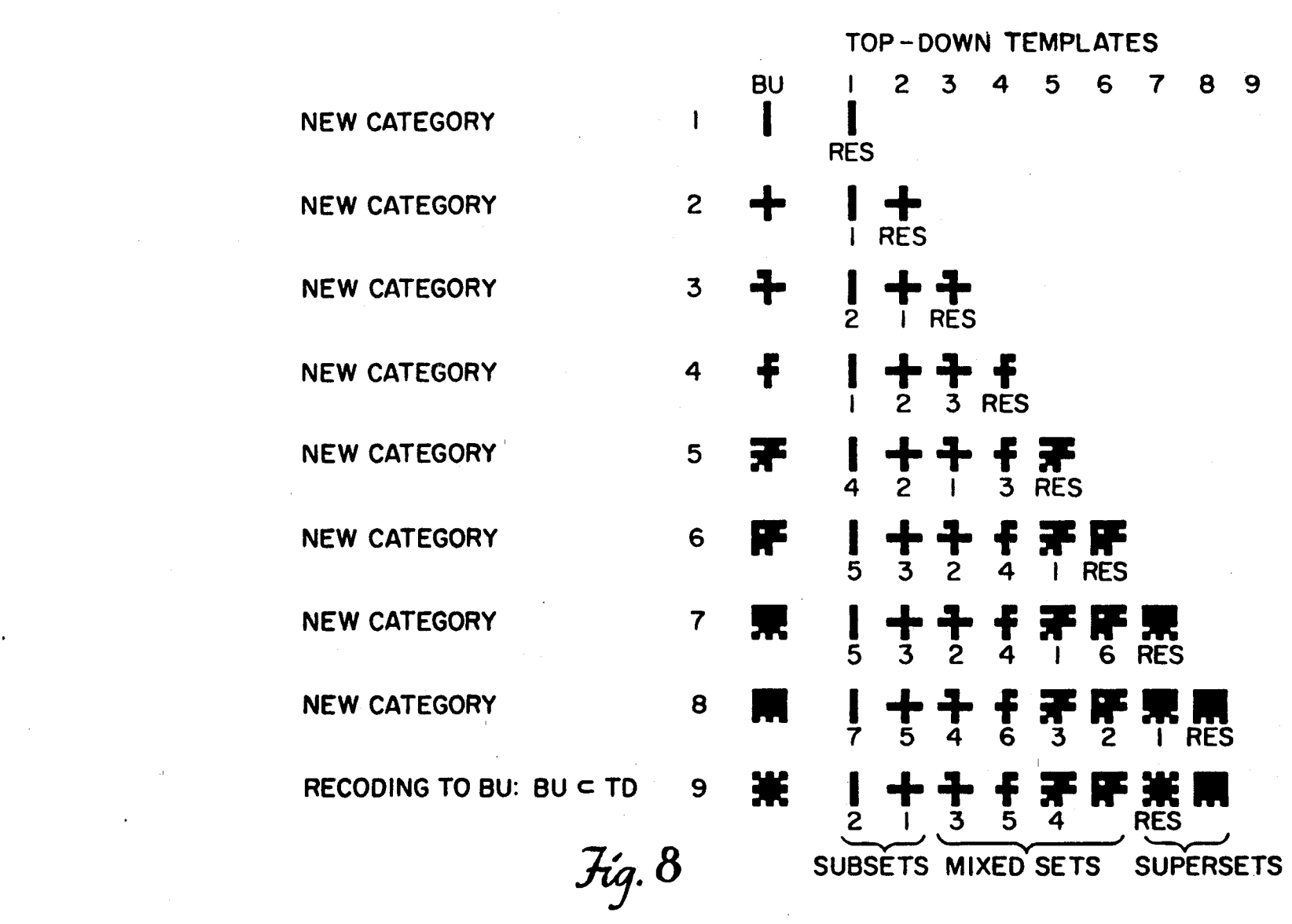
Figure 9:
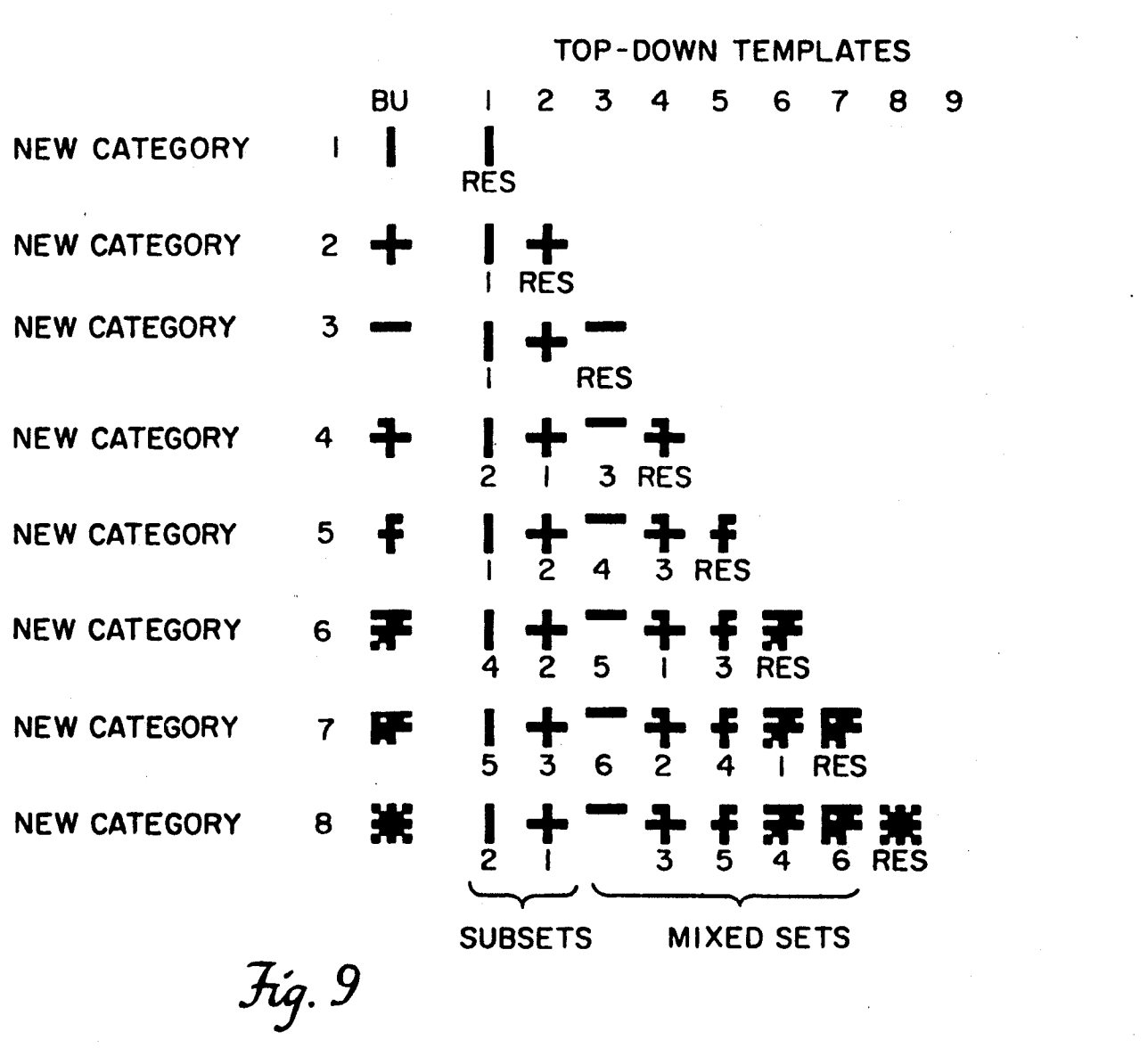

FIGS. 8 and 9 depict two coding sequences that illustrate the main points in the preceding discussion. In FIG. 8, each of nine input patterns was presented once. We consider the order of search that occurred in response to the final input pattern I that was presented on trial 9. By trail 8, nodes $v_1$ and $v_2$ had already encoded subset templates of this input pattern. On trial 9, these nodes were therfore searched in order of decreasing template size. Nodes $v_3$, $v_4$, $v_5$, and $v_6$ had encoded mixed templates of the input pattern. These nodes were searched in the order $v_3$, $v_5$, $v_4$. This search order was not determined by template size per se, but was rather governed by the ratio $|V^{(i)} \cap I| |V^{(i)}|^{-1}$ in (27). These ratios for nodes $v_3$, $v_5$ and $v_4$ were 9/10, 14/16 and 7/8, respectively. Since 14/16=7/8, node $v_5$ was searched before node $v_4$ because $|V^{(5)}| = 16\ 8 = |V^{(4)}|$. The mixed template node $v_6$ was not searched. After searching $v_5$, the network activated the node $v_7$ which possessed the smallest superset template. A comparison of rows 8 and 9 in column 7 shows how the superset template of $v_7$ was recoded to match the input pattern. Node $v_7$ was searched before node $v_6$ because the ratio $|I| |V^{(7)}|^{-1} = 17/21$ was larger than $|V^{(6)} \cap I| |V^{(6)}|^{-1} = 14/18$.

The eight input patterns of FIG. 9 were chosen to illustrate a search followed by coding of an uncommitted node. The last input pattern I in FIG. 9 was the same as the last input pattern in FIG. 8. In FIG. 9, however, there were no superset templates corresponding to input pattern I. Consequently I was coded by a previously uncommitted node $v_8$ on trial 8. In particular, on trial 8 the network first searched the nodes with subset templates in the order $v_2$, $v_1$. Then the mixed template nodes were searched in the order $v_4$, $v_6$, $v_5$, $v_7$. The mixed template node $v_3$ was not searched because its template badly mismatched the input pattern I. Instead, the uncommitted node $v_8$ was activated and learned a template that matched the input pattern.

If parameter $\beta$ is not small enough to satisfy inequality (18), then mixed templates or superset templates may be serched before subset templates. In all cases access of a perfectly coded pattern is achieved.

The preceding discussion casts new light on the issue of how invariant properties of a category can persist even while new learning takes place. Two main cases need to be differentiated. In the first case, a novel input pattern is coded by a node whose bottom-up filter and top-down template have previously undergone learning. In the second case, a novel input pattern is coded by a previously unchosen node. Our remarks herein will focus on the first case.

In this case, presentation of the novel input pattern does not immediately change the number of categories that are coded by the network, nor the set of nodes which code these categories in STM at $F_2$. Output signals from $F_2$ generate the network's observable responses. Hence, in this case, the novel pattern is assimilated into the previously established set of categorical alternatives and observable responses. At least two different types of learning can accompany such an assimilation process: learning that is external to the categorical recognition process and learning that is internal to this process.

As an example of external learning, suppose that the novel input is associated with a different reinforcement schedule than previous inputs in the same category. New learning between the category in $F_2$ and reinforcement mechanisms may alter the network's response to all the inputs in the category. Thus the very fact of membership in the same category may force forgetting of old external contingencies as new category exemplars are associated with new external contingencies.

As an example of internal learning, we consider the following facts. Even if a novel input pattern is coded by an "old" $F_2$ node, this input pattern may alter the bottom-up filter and top-down template corresponding to that node. In so doing, the novel input pattern may alter the categorical boundaries of the network as a whole. Input patterns which were coded by prescribed nodes on previous trials may no longer be coded by the sames nodes when they are presented later on. Thus, even if the number of categories and their pathways to overt responses do not change, the categorical invariants may change.

The ⅔ Rule implies, however, that the filters and templates of a category are subsets of all the input patterns that are coded by that category. Adding a new input pattern to a category through learning can only refine further the filters and templates of the category. Thus, after a template becomes a subset of an input pattern by coding that pattern, the template remains a subset of the input pattern for all future time, no matter how many times the template is refined as other input patterns join the same category. As a template becomes progressively finer, the mismatch between the template and the largest input patterns coded by its category becomes progressively greater. If this mismatch becomes too great, then some of these large input patterns may eventually be recoded. For example, in FIG. 7B, pattern B is coded by node $v_1$ on trial 2, and no new categories are established. Later, however, when pattern A is next presented on trial 4, it can no longer adequately match the template from node $v_1$, as it did after trial 1. Hence pattern A establishes a new category.

Two main conclusions follow from these considerations. First, the code learning process is one of progressive refinement of distinctions. The distinctions that emerge are the resultant of all the input patterns which the network ever experiences, rather than of some pre-assigned features. Second, the matching process compares whole patterns, not just separate features. For example, two different templates may overlap an input pattern to $F_1$ at the same set of feature detectors, yet the network could reset the $F_2$ node of one template yet not reset the $F_2$ node of the other template. The degree of mismatch of template and input as a whole determines whether recoding will occur. Thus the learning of categorical invariants resolves two opposing tendencies. As categories grow larger, and hence code increasingly global invariants, the templates which define them become smaller, and hence base the code on sets of critical feature groupings. Described below is how these two opposing tendencies can be resolved, leading to dynamic equilibration, or self-stabilization, of recognition categories in response to a prescribed input environment.

The next section describes how a sufficiently large mismatch between an input pattern and a template can lead to STM reset, while a sufficiently good match can terminate the search and enable learning to occur.

VIGILANCE, ORIENTING, AND RESET

We now show how matching within the attentional subsystem at $F_1$ determines whether or not the orienting subsystem A will be activated, thereby leading to reset of the attentional subsystem at $F_2$.

The orienting subsystem will only trigger reset of $F_2$ when the coincident pattern at $F_1$ indicates an inadequate coincidence and when an input I is received from the buffer 12. Requirement that an input pattern be received allows the system to distinguish between a mismatch between an expected pattern and an input pattern and mere passive inactivity when no input pattern is received. On the other hand, when an input is received and a sufficient coincident pattern is generated at $F_1$, reset of $F_2$ by the orienting system A is inhibited by the coincident pattern.

Suppose that a bottom-up input pattern has activated $F_1$ and blocked activation of A. Suppose, moreover, that $F_1$ activates an $F_2$ node which reads-out a template that badly mismatches the bottom-up input at $F_1$. Due to the ⅔ Rule, many of the $F_1$ nodes which were activated by the bottom-up input alone are suppressed by the top-down template. Suppose that this mismatch event causes a large collapse in the total activity across $F_1$, and thus a large reduction in the total inhibition which $F_1$ delivers to A. If this reduction is sufficiently large, then the excitatory bottom-up input to A may succeed in generating a nonspecific reset signal from A to $F_2$.

In order to characterize when a reset signal will occur, we make the following natural assumptions. Suppose that an input pattern I sends positive signals to $|I|$ nodes of $F_1$. Since every active input pathway projects to A, I generates a total input to A that is proportional to $|I|$. We suppose that A reacts linearly to the total input $\gamma|I|$. We also assume that each active $F_1$ node generates an inhibitory signal of fixed size to A. Since every active $F_1$ node projects to A, the total inhibitory input $\delta|X|$ from $f_1$ to A is proportional to the number X of active $F_1$ nodes. When $\gamma|I| > \delta|X|$, A receives a net excitatory signal and generates a nonspecific reset signal to $F_2$.

In response to a bottom-up input pattern I of size $|I|$ and prior to receipt of an expected pattern at $F_1$, the total inhibitory input from $F_1$ to A equals $\delta|I|$, so the net input to A equals $(\gamma - \delta)|I|$. In order to prevent A from firing in this case, we assume that $\delta \geq \gamma$. We call $$\rho = \gamma/\delta \tag{30}$$

the vigilance parameter of the orienting subsystem. The constraints $\delta \geq \gamma \geq 0$ are equivalent to $0 \leq \rho \leq 1$. The size of $\rho$ determines the proporation of the input pattern which must be matched in order to prevent reset.

When both a bottom-up input I and a top-down template $V^{(j)}$ are simultaneously active, the ⅔ Rule implies that the total inhibitory signal from $F_1$ to A equals $\delta|V^{(j)} \cap I|$. In this case, the orienting subsystem is activated only if $$|I| > \delta|V^{(j)} \cap I|; \tag{31}$$

that is, if $$\frac{|V^{(j)} \cap I|}{|I|} < \rho \tag{32}$$

The function which determines whether or not $F_2$ will be reset in response to an input pattern I is called the Reset Function. Inequality (32) shows that the Reset Function should be defined as follows:

$$R_j = \frac{|V^{(j)} \cap I|}{|I|}. \tag{33}$$

The Reset Function $R_j$ and the Order Function $$T_j = \frac{\alpha|V^{(j)} \cap I|}{\beta + |V^{(j)}|} \tag{9}$$

determine how the search will proceed.

This line of argument can be intuitively recapitulated as follows. Due to the ⅔ Rule, a bad mismatch at $F_1$ causes a large collapse of total $F_1$ activity, which leads to activation of A. In order for this to happen, the system must maintain a measure of the prior level of total $F_1$ activity. The criterion level is computed by summing bottom-up inputs at A. This sum can provide a criterion because it is proportional to the intitial activation of $F_1$ by the bottom-up input, and yet it remains unchanged as the matching process unfolds in real-time.

We now indicate how the network automatically rescales its noise criterion as the complexity of the input pattern varies. In particular, even with fixed parameters, the network can tolerate larger mismatches in response to larger input patterns. Suppose, for example, that the network processes two input patterns at different times. One input pattern $I^{(1)}$ activates just a few $F_1$ feature detectors. Whereas the other input pattern $I^{(2)}$ activates many $F_1$ feature detectors; that is, $$|I^{(1)}| < |I^{(2)}|. \tag{34}$$

Suppose, moreover, that $I^{(1)}$ activates the $F_2$ node $v_1$. $I^{(2)}$ activates the $F_2$ node $v_2$, and that $$|V^{(1)} \cap I^{(1)}| = V^{(2)} \cap I^{(2)}|. \tag{35}$$

In other words, both input patterns overlap their templates by the same amount. Due to (34), however, $$R_1 = \frac{|V^{(1)} \cap I^{(1)}|}{|I^{(1)}|} > \frac{|V^{(2)} \cap I^{(2)}|}{|I^{(2)}|} = R_2 \tag{36}$$

By inequalities (32) and (36), the network is more likely to reset $v_2$ in response to $I^{(2)}$ than it is to reset $v_1$ in response to $I^{(1)}$. Thus a fixed amount of match with a large input pattern provides less evidence for coding than the same amount of match with a small input pattern. If (35) holds, then the larger pattern $I^{(2)}$ disagrees with the template at more features than does the smaller pattern $I^{(1)}$. Hence, by (31), $v_2$ may be reset whereas $v_1$ may not be reset; this will, in fact, be the case when $\rho$ lies between $R_1$ and $R_2$.

The rescaling property shows that the network processes input patterns as a whole. The functional units of the network are activation patterns across a field of feature detectors, rather than individual activations of feature detectors.

If the network does not reset $v_1$ in response to $I^{(1)}$, then the template of $v_1$ is refined to equal the intersection $V^{(1)} \cap I^{(1)}$. In other words, given that the network accepts the evidence that $I^{(1)}$ should be coded by $v_1$, it then suppresses as noise the features at which $I^{(1)}$ disagrees with $V^{(1)}$, both in STM and in LTM.

Using this property, the network can also distinguish finer differences between small input patterns than between large input patterns. Suppose that the amount of mismatch between a small input pattern $I^{(1)}$ and its template $V^{(1)}$ equals the amount of mismatch between a large input pattern $I^{(2)}$ and its template $V^{(2)}$; that is, $$|I^{(1)}| - |V^{(1)} \cap I^{(1)}| = |I^{(2)}| - |V^{(2)} \cap I^{(2)}|. \qquad (37)$$

By (34) and (37), $$R_1 = \frac{|V^{(1)} \cap I^{(1)}|}{|I^{(1)}|} < \frac{|V^{(2)} \cap I^{(2)}|}{|I^{(2)}|} = R_2. \qquad (38)$$

Thus $v_1$ is more likely to be reset by $I^{(1)}$ than is $v_2$ to be reset by $I^{(2)}$. This shows that a fixed amount of mismatch offers more evidence for reset when the input pattern is simple than when it is complex. Otherwise expressed, since the network is reset by smaller mismatches when processing smaller input patterns, it automatically makes finer distinctions between smaller input patterns than between larger input patterns.

Figure 10:
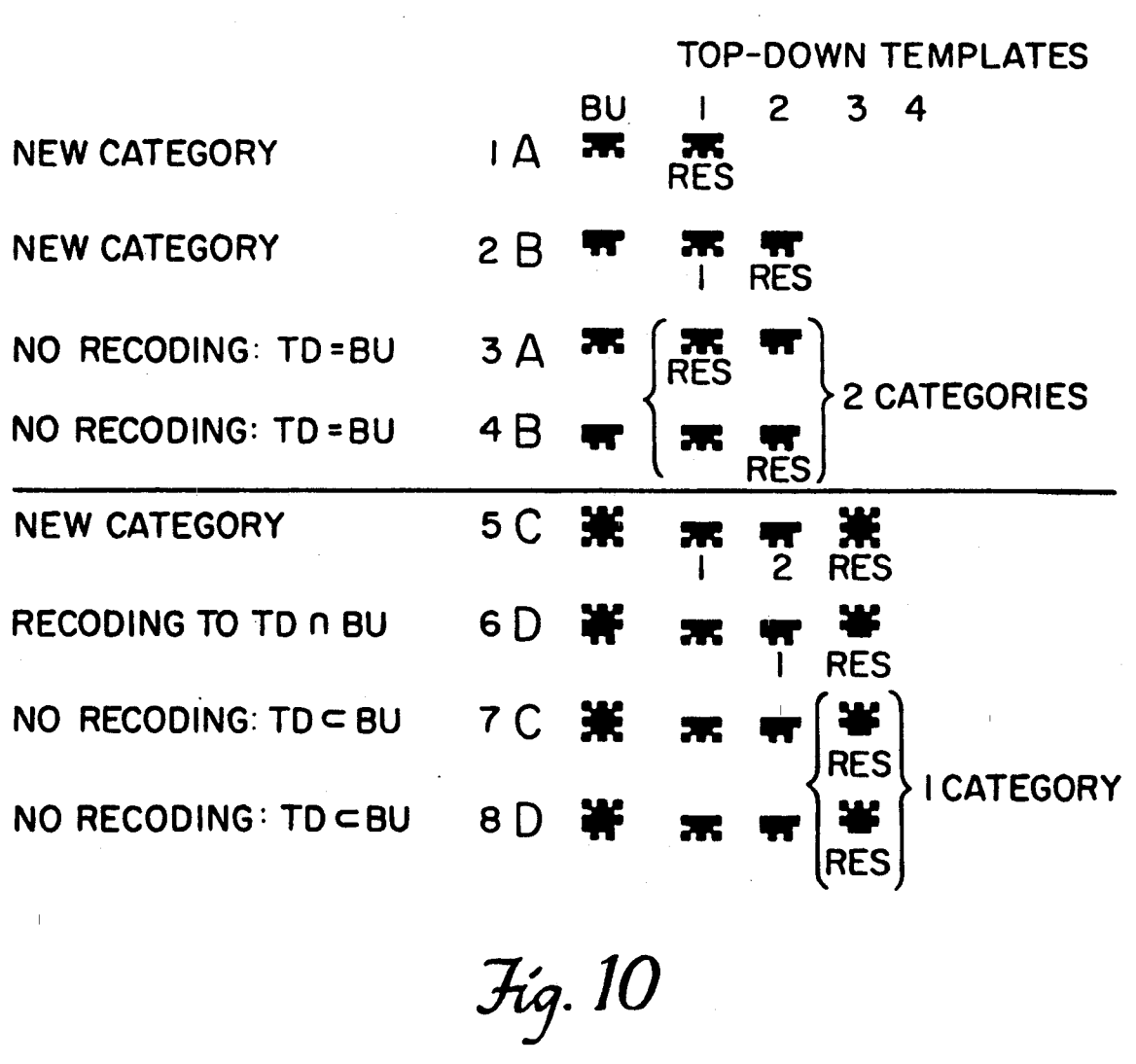

The simulation in FIG. 10 illustrates how the network automatically rescales its matching criterion. On the first four presentations, the patterns are presented in the order ABAB. By trial 2, coding is complete. Pattern A directly accesses node $v_1$ on trial 3, and pattern B directly accesses node $v_2$ on trial 4. Thus patterns A and B are coded within different categories. On trials 5–8, patterns C and D are presented in the order CDCD. Patterns C and D are constructed form patterns A and B, respectively, by adding identical upper halves to A and B. Thus, pattern C differs from pattern D at the same locations where pattern A differs from pattern B. However, because patterns C and D represent many more active features than patterns A and B, the difference between C and D is treated as noise, whereas the difference between A and B is considered significant. In particular, both patterns C and D are coded within the same category on trials 7 and 8.

The network's different categorization of patterns A and B vs. patterns C and D can be understood as follows. The core issue is: why on trial 2 does B reject the node $v_1$ which has coded A, whereas D on trial 6 accepts the node $v_3$ which has coded C? This occurs despite the fact that the mismatch between B and $V^{(1)}$ equals the mismatch between D and $V^{(3)}$:

$$|B| - |V^{(1)} \cap B| = 3 = |D| - |V^{(3)} \cap D|, \qquad (39)$$

as in equation (37). The reason can be seen by comparing the relevant reset functions:

$$R_{1B} = \frac{|V^{(1)} \cap B|}{|B|} = \frac{8}{11} \qquad (40)$$

and $$R_{3D} = \frac{|V^{(3)} \cap D|}{|D|} = \frac{14}{17}. \qquad (41)$$

In this simulation, the vigilance parameter $\rho = 0.8$. Thus $$R_{1B} < \rho < R_{3D}. \qquad (42)$$

By (32), pattern B resets $v_1$, but D does not reset $v_3$. Consequently, B is coded by a different category than A, whereas D is coded by the same category as C.

As noted, given each fixed vigilance level, the network automatically rescales its sensitivity to patterns of variable complexity. Also, changes in the vigilance level can regulate the coarseness of the categories that are learned in response to a fixed sequence of input patterns.

A low vigilance level leads to learning of coarse categories, whereas a high vigilance level leads to learning of fine categories. Suppose, for example, that a low vigilance level has led to a learned grouping of inputs which need to be distinguished for successful adaptation to a prescribed input environment. Suppose, moreover, that a punishing event occurs through input 50 as a consequence of this erroneous grouping. Such a punishing event may have multiple effects. In addition to its negative reinforcing effects, we suppose that it also has a direct cognitive effect; namely, it increases attentive sensitivity to the environment. Such an increase in sensitivity is modelled within the network by an increase in the vigilance parameter, $\rho$. Increasing this single parameter enables the network to discriminate patterns which previously were lumped together. Once these patterns are coded by different categories in $F_2$, the different categories can be associated with different behavioral responses.

In this way, environmental feedback such as a punishing event can act as a "teacher" for a self-organizing recognition system. This teaching function does not take the form of an algorithm or any other type of pattern-specific information. Rather, it sets a single nonspecific parameter whose interaction with the internal organization of the network enables the network to parse more finely whatever input patterns happen to occur. The vigilance parameter will be increased, for example, if all the signals from the input pattern to A are nonspecifically amplified, so that parameter increases. A nonspecific decrease in the size of signals $\delta$ from $F_1$ to A will also increase $\rho$. Alternatively, reinforcement-activated nonspecific excitatory input to A can also facilitate mismatch-mediated activation of A. The process whereby the level of vigilance is monitored is one of the three types of nonspecific arousal that exist within the network.

FIG. 11 describes a series of simulations in which four input patterns, A, B, C, D, are coded by a network with four nodes in $F_2$. In this simulation, $A \subset B \subset C \subset D$. The different parts of the figure show how categorical learning changes with changes of $\rho$. The simulation shows that any consecutive pair of patterns, (A,B), (B,C), (C,D), can be coded in the same category at different vigilance levels. When $\rho = 0.8$ (FIG. 11A), four categories are learned: (A)(B)(C)(D). When $\rho = 0.7$ (FIG. 11B), three categories are learned: (A)(B)(C,D). When $\rho = 0.6$ (FIG. 11C), three different categories are learned: (A)(B,C)(D). When $\rho = 0.5$ (FIG. 11D), two categoreies are learned: (A,B)(C,D). When $\rho = 0.3$ (FIG. 11E), two different categories are learned: (A,B,C)(D). When $\rho = 0.2$ (FIG. 11F), all the patterns are lumped together into a single category.

Figure 12:
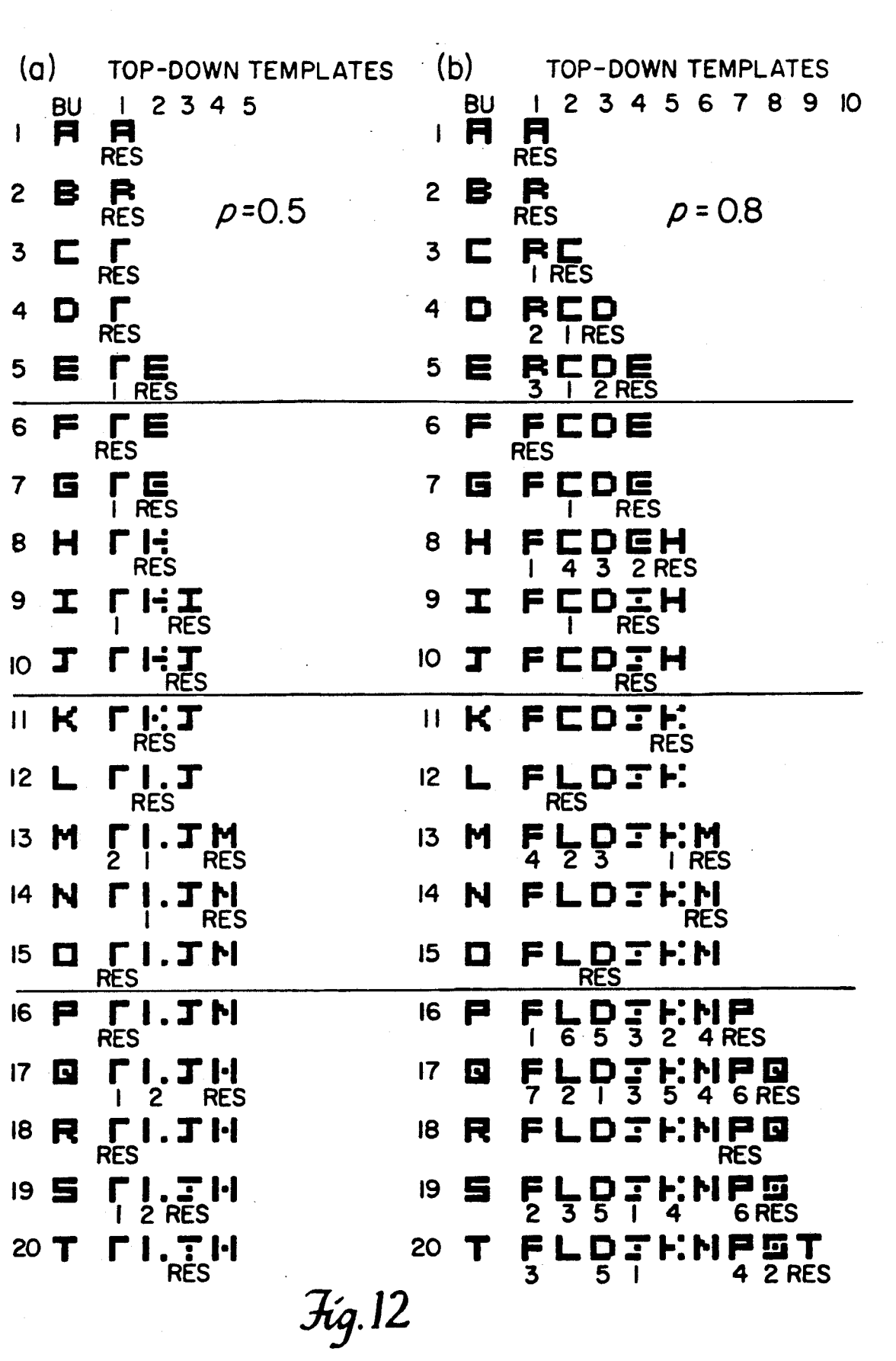

In order to illustrate how such a network codifies a more complex series of patterns, we show in FIG. 12 the first 20 trials of a simulation using alphabet letters as input patterns. In FIG. 12A, the vigilance parameter $\rho = 0.5$. In FIG. 12B, $\rho = 0.8$. Three properties are notable in these simulations. First, choosing a different vigilance parameter can determine different coding histories, such that higher vigilance induces coding into finer categories. Second, the network modifies its search order on each trial to reflect the cumulative effects of prior learning, and bypasses the orienting system to directly access categories after learning has taken place. Third, the templates of coarser categories tend to be more abstract because they must approximately match a larger number of input pattern exemplars.

Given $\rho=0.5$, the network groups the 26 letter patterns into eight stable categories within three presentations. In this simulation, $F_2$ contains 15 nodes. Thus 7 modes remain uncoded because the network self-stabilizes its learning after satisfying criteria of vigilance and global code self-consistency. Given $\rho=0.8$ and 15 $F_2$ nodes, the network groups 25 of the 26 letters into 15 stable categories within 3 presentations. The 26th letter is rejected by the network in order to self-stabilize its learning while satisfying its criteria of vigilance and global code self-consistency. These simulations show that the network's use of processing resources depends upon an evolving dynamic organization with globally context-sensitive properties. This class of networks is capable of organizing arbitrary sequences of arbitrarily complex input patterns into stable categories subject to the constraints of vigilance, global code self-consistency, and number of nodes in $F_1$ and $F_2$. If slow learning rather than fast learning rates are used, then the categorical code may be learned more slowly but it still enjoys the critical properties just listed.

While this invention has been particularly shown and described with references to preferred embodiments thereof, it will be understood by those skilled in the art that various changes in form and details may be made therein without departing from the spirit and scope of the invention as defined by the appended claims.

We claim:

1. A self-organizing pattern recognition system comprising:
   input means for providing a plurality of input elements of an input pattern;
   adaptive filter means for individually weighting the input elements relative to each of a plurality of categories;
   means for providing, relative to each category, a category selection indication representing a combination of weighted elements from the adaptive filter means and for selecting, based on the category selection indications, at least one selected category;
   template means for defining an expected pattern corresponding to the at least one selected category;
   means for detecting a sufficient coincidence between the input pattern and the expected pattern; and
   means for modifying the adaptive filter means and the expected pattern relative to the at least one selected category where the sufficient coincidence is detected, to retain elements in common with the input pattern and expected pattern and to deemphasize all other elements, and for selecting an alternative category without immediate modification of the adaptive filter means and template means where a sufficient coincidence is not detected, the alternative category then serving to generate, through the template means, an alternative expected pattern to be compared to the input pattern.

2. A system as claimed in claim 1 wherein the means for detecting the sufficient coincidence weights a coincidence between the patterns relative to pattern complexity.

3. A system as claimed in claim 2 wherein the coincidence is determined from a coincident pattern which is an intersection between the input pattern and the expected pattern.

4. A system as claimed in claim 3 wherein the means for detecting the coincidence comprises means for determining the number of elements in the coincident pattern relative to the number of elements in the input pattern.

5. A system as claimed in claim 3 wherein the means for modifying includes means for reducing to about zero the weighting of elements, relative to the selected category, which are not in the coincident pattern.

6. A system as claimed in claim 3 wherein the coincident pattern is the input pattern when no expected pattern is generated and the coincident pattern is contained within the intersection between the input pattern and the expected pattern when an expected pattern is received.

7. A system as claimed in claim 6 wherein the elements of the patterns are of binary values and the coincident pattern is the intersection between the input pattern and the expected pattern when an expected pattern is received.

8. A system as claimed in claim 3 wherein the predetermined coincidence is detected when the number of elements in the coincident pattern relative to the number of elements in the input pattern is greater than or equal to a vigilance parameter.

9. A system as claimed in claim 8 wherein the selection means selects a category according to an order function defined as the ratio of (a) the product of a constant $\alpha$ and the number of elements in the coincident pattern to (b) the sum of a constant $\beta$ and the number of elements in the expected pattern.

10. A system as claimed in claim 1 wherein the selection means selects only the single category having the largest sum of weighted input elements.

11. A system as claimed in claim 1 wherein the means for modifying modifies the weighting of the input elements in the adaptive filter to a degree inversely related to the number of elements in the intersection between the input pattern and the expected pattern.

12. A system as claimed in claim 11 wherein the inverse relationship is of the form $$\frac{\alpha}{\beta + |I \cap V^{(j)}|}$$

13. A system as claimed in claim 12 wherein $\beta$ is small.

14. A system as claimed in claim 12 wherein the initial weighting of all possible elements is low and the initial templates include substantially all possible elements from each of substantially all possible categories.

15. A system as claimed in claim 14 wherein different initial weighting is provided to each possible category.

16. A system as claimed in claim 1 further comprising means for changing the sufficient coincidence of the input pattern and the expected pattern which results in modification of the adaptive filter means and the template means.

17. A system as claimed in claim 1 further comprising means for defining an expected pattern prior to receipt of an input pattern by the system to anticipate an input pattern of the category corresponding to the expected pattern.

18. A self-organizing pattern recognition system comprising:

input means for providing a plurality of input elements of an input pattern;

adaptive filter means for individually weighting the input elements relative to each of a plurality of categories;

means for providing, relative to each category, a category selection indication representing a combination of weighted elements from the adaptive filter means and for selecting, based on the category selection indications, at least one selected category;

template means for defining an expected pattern corresponding to the at least one selected category;

means for detecting a sufficient coincidence between the input pattern and the expected pattern by weighting a coincidence between the patterns relative to the complexity of the input pattern;

means for modifying the adaptive filter means and the expected pattern relative to the at least one selected category, where the sufficient coincidence is detected, and for selecting an alternative category without immediate modification of the adaptive filter means and template means where a sufficient coincidence is not detected, the alternative category then serving to generate, through the template means, an alternative expected pattern to be compared to the input pattern.

19. A system as claimed in claim 18 wherein the coincidence is determined from a coincident pattern which is an intersection between the input pattern and the expected pattern.

20. A system as claimed in claim 19 wherein the means for detecting the coincidence comprises means for determining the number of elements in the coincident pattern relative to the number of elements in the input pattern.

21. A system as claimed in claim 19 wherein the coincident pattern is the input pattern when no expected pattern is generated and the coincident pattern is contained within the intersection between the input pattern and the expected pattern when an expected pattern is received.

22. A system as claimed in claim 19 wherein the predetermined coincidence is detected when the number of elements in the coincident pattern relative to the number of elements in the input pattern is greater than or equal to a vigilance parameter.

23. A system as claimed in claim 22 wherein the selection means selects a category according to an order function defined as the ratio of (a) the product of a constant $\alpha$ and the number of elements in the coincident pattern to (b) the sum of a constant $\beta$ and the number of elements in the expected pattern.

24. A self-organizing pattern recognition system comprising:

input means for providing a plurality of input elements of an input pattern;

adaptive filter means for individually weighting the input elements relative to each of a plurality of categories;

means for providing, relative to each category, a category selection indication representing a combination of weighted elements from the adaptive filter means and for selecting, based on the category selection indications, at least one selected category;

template means for defining an expected pattern corresponding to the at least one selected category;

means for detecting a sufficient coincidence between the input pattern and the expected pattern by weighting a coincidence between the patterns relative to the complexity of the input pattern; and means for modifying the adaptive filter means and the expected pattern relative to the at least one selected category where the sufficient coincidence is detected, to modify weighting of input elements in common with the input pattern and expected pattern to a degree inversely related to the number of elements in the intersection between the input pattern and the expected pattern and to deemphasize all other elements, and for selecting an alterative category without immediate modification of the adaptive filter means and template means where a sufficient coincidence is not detected, the alternative category then serving to generate, through the template means, an alternative expected pattern to be compared to the input pattern.

25. A system as claimed in claim 24 wherein the initial weighting of all possible elements is low and the initial templates include substantially all possible elements from each of substantially all possible categories.

26. A system as claimed in claim 24 wherein the coincident pattern is the input pattern when no expected pattern is generated and the coincident pattern is contained within the intersection between the input pattern and the expected pattern when an expected pattern is received.

27. A system as claimed in claim 24 further comprising means for defining an expected pattern prior to receipt of an input pattern by the system to anticipate an input pattern of the category corresponding to the expected pattern.

28. In a data processing system, a method of categorizing patterns comprising:

storing expected input patterns relative to a plurality of categories;

individually weighting input elements of an input pattern relative to each of a plurality of categories and selecting at least one category as an output pattern based on combinations of weighted elements;

detecting a sufficient coincidence between the input pattern and a stored expected input pattern corresponding to the at least one selected category of the output pattern; and modifying the weighting of the input elements and modifying the stored expected input pattern relative to the at least one selected category of the output pattern where sufficient coincidence is detected to retain elements in common with the input patterns and expected input pattern and to deemphasize all other elements, and selecting an alternative category without immediate modification of the weighting and expected input pattern where sufficient coincidence is not detected, and repeating the detecting and modifying steps for the alternative category.

29. A method as claimed in claim 28 wherein the sufficient coincidence is detected by weighting a coincidence between the input and expected input patterns relative to pattern complexity.

30. A method as claimed in claim 29 wherein the weighting of the input elements is modified to a degree inversely related to the number of elements in the intersection between the input pattern and the expected pattern.

31. In a data processing system, a method of categorizing patterns comprising:
- storing expected input patterns relative to a plurality of categories;
- individually weighting input elements of an input pattern relative to each of a plurality of categories and selecting at least one category as an output pattern based on combinations of weighted elements;
- detecting a sufficient coincidence between the input pattern and a stored expected input pattern corresponding to the at least one selected category of the output pattern by weighting a coincidence between the patterns relative to the complexity of the input pattern; and
- modifying the weighting of the input elements and modifying the stored expected input pattern relative to the at least one selected category of the output pattern where sufficient coincidence is detected and selecting an alternative category without immediate modification of the weighting and expected input pattern where sufficient coincidence is not detected and repeating the detecting and modifying steps for the alternative category.

* * * * *

UNITED STATES PATENT AND TRADEMARK OFFICE
CERTIFICATE OF CORRECTION

PATENT NO. : 5,142,590

DATED : August 25, 1992

INVENTOR(S) : Gail A. Carpenter and Stephen Grossberg

It is certified that error appears in the above-indentified patent and that said Letters Patent is hereby corrected as shown below:

Column 1, After line 5:
Insert the following as the first paragraph under the heading "Government Support."

--This invention was made with Government support under Contract N00014-83-K-0337 awarded by the Department of the Navy. The Government has certain rights in the invention.--

In column 1, line 5, after "The U.S. government" insert --also--.

Signed and Sealed this

Eighth Day of March, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,142,590
DATED : August 25, 1992
INVENTOR(S) : Gail A. Carpenter and Stephen Grossberg It is certified that error appears in the above-indentified patent and that said Letters Patent is hereby corrected as shown below:

In column 1, line 11, after "NSF-IST-8417756," insert --and the Department of the Navy, Grant N00014-91-J-4100--.

Signed and Sealed this

Twenty-fourth Day of December, 1996

Attest:

BRUCE LEHMAN

*Attesting Officer*   *Commissioner of Patents and Trademarks*